United States Patent
Scheifler et al.

(10) Patent No.: US 7,886,021 B2
(45) Date of Patent: Feb. 8, 2011

(54) SYSTEM AND METHOD FOR PROGRAMMATIC MANAGEMENT OF DISTRIBUTED COMPUTING RESOURCES

(75) Inventors: Robert W. Scheifler, Somerville, MA (US); John W. McClain, Lexington, MA (US); Peter C. Jones, Lexington, MA (US); Thomas V. Johnson, Lexington, MA (US)

(73) Assignee: Oracle America, Inc., Redwood City, CA (US)

( * ) Notice: Subject to any disclaimer, the term of this patent is extended or adjusted under 35 U.S.C. 154(b) by 288 days.

(21) Appl. No.: 12/110,880

(22) Filed: Apr. 28, 2008

(65) Prior Publication Data

US 2009/0271472 A1    Oct. 29, 2009

(51) Int. Cl.
*G06F 15/16* (2006.01)
(52) U.S. Cl. .................. 709/217; 709/220; 709/226
(58) Field of Classification Search .................. 709/217
See application file for complete search history.

(56) References Cited

U.S. PATENT DOCUMENTS

| | | | |
|---|---|---|---|
| 6,516,350 | B1 | 2/2003 | Lumelsky et al. |
| 7,200,530 | B2 | 4/2007 | Brown et al. |
| 7,568,037 | B2 * | 7/2009 | Laurent et al. .............. 709/226 |
| 7,574,343 | B2 * | 8/2009 | Levi et al. ..................... 703/13 |
| 7,606,898 | B1 * | 10/2009 | Hunt et al. .................. 709/225 |
| 7,636,794 | B2 * | 12/2009 | Ramos et al. ............... 709/248 |
| 7,684,964 | B2 * | 3/2010 | Outhred et al. ................ 703/2 |
| 2005/0021847 | A1 * | 1/2005 | Rothman et al. ............ 709/238 |
| 2006/0224790 | A1 * | 10/2006 | Arndt et al. .................... 710/62 |
| 2007/0266123 | A1 * | 11/2007 | Johannesson et al. ........ 709/220 |
| 2008/0288380 | A1 * | 11/2008 | Nam et al. ..................... 705/34 |

OTHER PUBLICATIONS

Globus Toolkit Version 4: Software for Service-Oriented Systems. I. Foster. IFIP International Conference on Network and Parallel Computing, Springer-Verlag LNCS 3779, pp. 2-13, 2006.

(Continued)

*Primary Examiner*—Wing F Chan
*Assistant Examiner*—Tesfay Yohannes
(74) *Attorney, Agent, or Firm*—Robert C. Kowert; Meyertons, Hood, Kivlin, Kowert & Goetzel, P.C.

(57) ABSTRACT

Systems and methods for providing a development and deployment platform for Software as a Service (SaaS) providers are disclosed. The platform may provide an application programming interface (API) through which customers may configure virtualized grids of language-level virtual machines (VMs), networks, and storage resources. A grid may be horizontally scalable and programmatically configurable by a customer and/or customer code. The platform may allow dynamic scaling of resources (up and down) to match changing demands, by allowing customers and/or customer code to programmatically alter their own system level structure at runtime, through the API. The grid may be accessed by both on-grid and off-grid processes, through internal and external connectivity resources provided by the platform. The platform may provide common utilities for end-user services, deployment operations, and development tasks (e.g., debugging), and may include frameworks and macro-components (e.g. web servers). The platform may host long-running Internet-based services and/or one-shot computational services.

19 Claims, 13 Drawing Sheets

OTHER PUBLICATIONS

Salwen, Fay; Murray, Peter; Subbarayan, Uday; The Sun Grid Compute Utility, Session TS-1109, JavaOne Conference, 2006.
Amazon Elastic Compute Cloud Developer Guide, API Version Aug. 8, 2008, Amazon Web Services, 2008.
N1 Grid Engine 6 User's Guide, Sun Microsystems, May 2006.
Scheifler, Bob; Project Caroline: Platform As A Service, For Your Service, At Your Service; Session TS-1991; JaveOne Conference, 2007.
Scheifler, B., "Project Caroline; Platform As A Service, For Your Service, At Your Service," Sun Website, 2007 JavaOne Conference—Session TS-1991, Dec. 19, 2007.
Anonymous, "Project Caroline: Platform As A Service", Sun Website, 2008 Sun Labs Open House—Menlo Part, Apr. 9-10, 2008, Apr. 11, 2008. XP007909297.
International Search Report for PCT/US2009/042004 mailed Sep. 11, 2009.

* cited by examiner

SYSTEM AND METHOD FOR PROGRAMMATIC MANAGEMENT OF DISTRIBUTED COMPUTING RESOURCES

BACKGROUND OF THE INVENTION

1. Field of the Invention

This invention relates generally to distributed computing resources, and more particularly to systems and methods for programmatically configuring virtual computing systems and managing distributed computing, network, and storage resources to provide computing services.

2. Description of the Related Art

Today, many web-based applications, including Software as a Service (SaaS) applications, are implemented using an architecture consisting of multiple distributed components in order to address scalability and reliability. The individual resources in use may reside on physically or logically separate machines. These resources are typically compute and/or storage resources interconnected through networks. As the number of resources in use grows larger it becomes increasingly difficult to manage the provisioning and monitoring of such resources, as well as the deployment of application level components on them. The problem becomes more difficult with increasing dynamism in the application environment. For example, SaaS environments tend to be more dynamic in the frequency and number of feature rollouts, as well as in terms of the variability of load on the application, than other types of web-based applications.

Solutions that attempt to address parts of this problem include "grid" related technologies or distributed resource managers such as the Globus® Toolkit, the Sun Grid Compute Utility from Sun Microsystems, the Elastic Compute Cloud (EC2) from Amazon Web Services, and other application and server provisioning technologies, including the N1 Grid Engine line of products from Sun Microsystems. However, there exists a need for facilities to enable automated management of these kinds of environments on behalf of the emerging market of small and medium sized SaaS providers, thereby limiting the increasing costs associated with their management.

SUMMARY

Systems and methods for providing a dynamic virtualized grid of language-level virtual machines (VMs), networks, and storage are disclosed. The systems and methods described herein may in some embodiments operate to host services on behalf of software-as-a-service (SaaS) providers and/or business-internal applications. The systems and methods described herein may help SaaS providers deal with continuously changing demands on their services by speeding up development and delivery of those services using high-level programming languages, allowing them to update in-production services frequently. A system such as described herein may be designed to serve as a commercial hosting platform for both the development and deployment of long-running Internet-based services. In some embodiments, the system may support the ability to dynamically scale resource usage both up and down to match changing demands by providing SaaS providers the ability to programmatically create and alter their own system level structures (e.g., their own virtual systems) at runtime, drawing from a horizontally scaled pool of virtualized compute, storage, and network resources.

The systems and methods described herein may be implemented as a computing platform that eases the development, deployment, management and monitoring of distributed applications and/or services. This platform may include a programmatic API usable to manage resources dynamically and without the need to involve a human administrator. The use of such an API may in some embodiments enable programs (e.g., applications that implement a service) to securely manage their own resources in a consistent fashion, including naming, discovery, creation, deletion, modification, and monitoring of those resources, and to deal with failures that occur during any of these operations. In some embodiments, the API may provide a consistent scheme for tracking significant state changes of the managed resources through event delivery. The platform may provide the ability to deal with a collection of distributed resources as a single aggregate system, and also the ability to compose collections of resources towards the construction of larger applications. Furthermore, the platform may be configured to track certain dependencies between resources, enabling a customer application to detect potential inconsistencies that may arise during the manipulation of those resources.

In some embodiments, platform resources (including language-level virtual machines, networks, and network accessible file systems and databases) are exposed through high-level abstractions. These abstractions may improve developer productivity by providing simplified interfaces to infrastructure resources. They may also enable developers to create robust, long-living services by insulating service code from changes to the underlying infrastructure. The system and methods described herein may in some embodiments present a horizontally scaled pool of distributed resources as a single system, providing developers with a unified platform for allocating and controlling these resources (e.g., as a dynamically configurable virtual system). In addition to simplifying a developer's use of distributed resources, this unified system model may also allow the platform to draw on the horizontally scaled resource pool to meet the allocation requests of multiple applications, which may be executing on behalf of multiple users.

The methods described herein may be implemented by program instructions included in a memory coupled to one or more processors in a computing system, (e.g., by program instructions included in a computer-readable storage medium and executable by the one or more processors in the computing system), in some embodiments. The program instructions may be included in the same memory as one in which local and/or shared data is stored, or in a different memory, in different embodiments. In some embodiments, the principal VM may be the Java™ Virtual Machine (JVM). In other embodiments, other VMs may be supported, including those based on other dynamic and/or object-oriented languages such as Perl™, Ruby, and Python®, or on any other suitable language.

A development and deployment platform, as described herein, may in some embodiments support programmatic spawning of VMs in a distributed computing environment; programmatic allocation of networks, IP addresses, host names, file systems, and database instances; and programmatic control of network connectivity between resources (e.g., between VMs, storage, and the Internet), including connectivity between resources of different customers. In some embodiments, platform storage resources may include a ZFS file system (e.g., a Zettabyte File System in Solaris™), and developers may be able to take advantage of ZFS features such as snapshots and clones during development and/or deployment of their applications. Internet-facing connectivity supported by the platform may in various embodiments include static and dynamic Network Address Translation (NAT), Layer-4 and/or Layer-7 load balancing (including HTTPS), name-based virtual hosting, and direct binding to Internet-routable IP addresses for maximum protocol flexibility. The base system API may in some embodiments be layered on Java™ Platform, Standard Edition (Java SE).

In some embodiments, off-grid developer access to the system may be provided via the same API that is used on-grid, via Web-based Distributed Authoring and Versioning (Web-DAV) for file systems, and/or via a web portal. Developer tools provided and/or supported by the platform may include NetBeans Integrated Development Environment (IDE) support for remotely deploying and debugging applications on the platform. Higher-level frameworks may be provided to automate on-grid deployment and management of subsystems and applications. For example, in one embodiment, the platform may provide automated deployment and network configuration of multiple Apache Tomcat instances in a load-balanced configuration. Various utilities and/or end-user services may also be provided by the platform. For example, in one embodiment, the platform may include a system-wide Liberty identity provider, which may provide end-user identity management on behalf of one or more SaaS providers according to the open standards of the Liberty Alliance.

In some embodiments, the platform may make use of features of the underlying operating system. For example, Solaris™ Operating System (Solaris™ OS) Zones may be used for VM isolation and network binding control, in some embodiments. In some embodiments, Solaris OS resource pools and the fair share scheduler may be used to manage processor allocations; the IP Filter of Solaris may be used in network connectivity control; and Solaris extended accounting facilities may be used to account for CPU time and network traffic.

Figure 1:
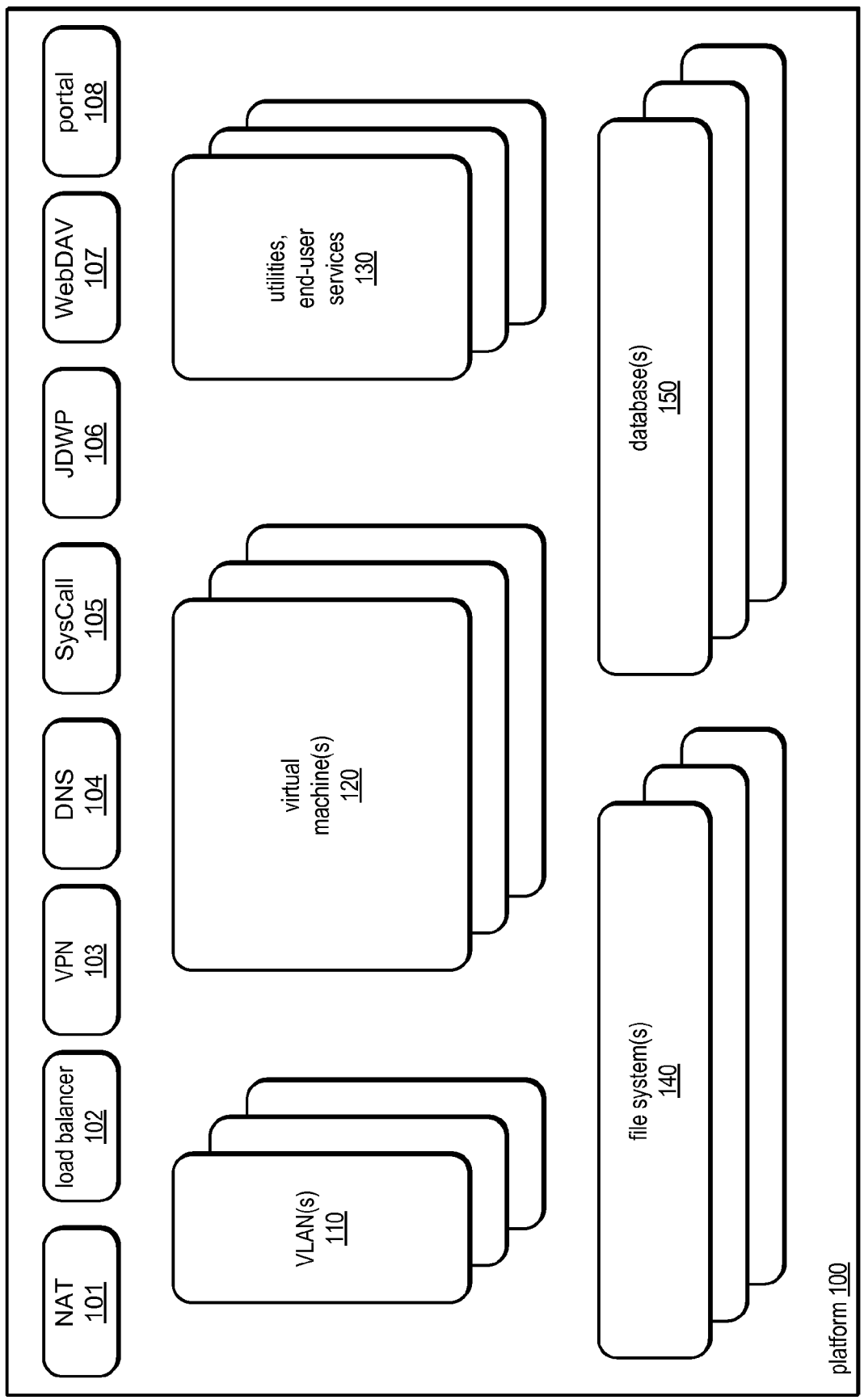
FIG. 1 is a block diagram illustrating a development and deployment platform, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for providing a horizontally scalable hosting platform for the development and deployment of services (e.g., long-running Internet-based services) are disclosed. The platform may in some embodiments support multiple users and/or applications. For example, in some embodiments, the platform may be made available as a utility, where a pool of virtualized resources is shared between many customers each with one or more services. Through the utility model, services may dynamically flex their usage of the platform's distributed resources up and down, matching usage to the observed load. The horizontal scalability of the platform may allow for the efficient delivery of resources and may support a pay-for-use (verses a pay-for-capacity) billing model. As used herein a deployed instance of the platform may be referred to as a grid, and a person or organization that runs software on a grid may be referred to as a customer. In some embodiments, customers of the utility may be isolated from each other and mechanisms may be provided for the isolation of services.

The primary resource provided by the platform is a set of horizontally scaled machines for running customer processes. Customers may specify (for each process) the program to run, what networked file systems the process should have access to, and the IP addresses at which it should be reachable. The platform may take care of the details of finding a machine for the process to run on, and configuring the machine, network, and Internet connectivity according to the customer's requirements. In some embodiments, operating system-level virtualization may be used to isolate processes sharing the same physical machine while keeping per-process overhead low. Customer programs may be expressed in high-level languages such as Java™ byte code, Perl™, Ruby, and Python®, or other languages that provide operating system independence and instruction set independence, in some embodiments. Other resources may include IP sub-nets, network file systems, databases, external IP addresses, Layer-4 and/or Layer-7 load balancers, and Domain Name System (DNS) bindings.

Applications may dynamically allocate, configure, use, and release resources using the platform API. Through the platform API, applications may acquire and release resources quickly and easily, as needs change. The operations of the platform API may in some embodiments constitute the lowest level public interface to a grid. In some embodiments, they may serve as the foundation for higher-level frameworks, and may favor flexibility and fine-grained control over ease of use and direct productivity. In some embodiments, the APIs may not impose any structure on applications and may take a minimal role in dependency management. In various embodiments, most or all of the APIs may be invoked by programs regardless of whether they are running on the grid or off-grid.

Note that, in some embodiments, most or all of the methods defined in these APIs may be atomic. In other words, if one such method completes without throwing an exception (e.g., a RemoteException), its effects will be complete when it returns. Otherwise (e.g., if it fails to complete successfully), there will be no effect on the system of having begun the execution of the method. In addition to being atomic, the methods defined by the APIs may in some embodiments be durable, satisfying yet another property of the ACID (Atomicity, Consistency, Isolation, Durability) principle. If concurrent calls are made into such an API, the associated operations will occur in some unspecified order. If it is important for the operations to complete in some particular order, the application may synchronize the method calls across the threads making the calls. In addition to the platform API, various tools and components may be layered on top of the platform API, such as a standalone graphical user interface (GUI) and NetBeans plugin that allow for direct manipulation of platform resources, Apache Ant tasks that allow creation of management resources to be easily automated, and/or macro-components such as a Web Server that automates setup and management of a horizontally scaled web tier.

The platform may support various instruction set and operating system agnostic interpreters and virtual machines, along with their associated runtime libraries. For example, in one embodiment, a system call API may include a Java™ programming language binding. Each supported VM and interpreter may be referred to as a runtime environment. In various embodiments, the platform may or may not support "native code" execution.

The hosting platform described herein may be conceptually thought of as consisting of programmatic tinker toys, where the construction pieces are computation, storage, and network elements. As previously noted, computation may be performed in language-level virtual machines, running high-level languages like Java™, Perl™, Ruby, and Python® (as opposed to, for example, Xen™ or VMware-level VMs). Persistent storage may in some embodiments be provided in two or more resource types, including file systems and relational databases. These VMs and storage elements may be connected (i.e., wired) together into internal virtual local area networks (VLANs), and may also be connected out to the Internet. However, rather than having a fixed set of construction pieces and a manual assembly operation, the platform may provide complete programmatic control for assembly of virtual systems (i.e., grids).

A grid interface (API) may be thought of as serving as a factory for grid resources. Each resource may be represented by an object that serves as a proxy for that resource. The grid interface may also serve as a factory for references to existing grid resources. Control, monitoring, and de-allocation of grid resources may be generally performed through a resource's proxy. Customers and/or customer code may programmatically create resources, as needed, virtually wire and rewire them together, and destroy them when they are no longer needed. In other words, the platform may provide the customer full runtime control over the system level structure of their services.

High-level platform features may in various embodiments include:

Full programmatic life cycle control over all system resources and their structure, enabling services to dynamically flex their own platform resource usage at runtime without human intervention.

Exposure of resources through higher-level abstractions that hide operating system and hardware details from the customer, thereby improving developer productivity and insulating customer code from changes to the underlying infrastructure.

A uniform platform for network scale system construction, built on an infrastructure that is designed to take advantage of horizontal scaling and to support multi-tenant operations reliably and securely, while still providing an integrated system view to the developer.

A block diagram illustrating one embodiment of a hosting platform, as described herein, is illustrated in FIG. 1. In this example, platform 100 comprises many of the major resources and services that may be included in such a system. At the heart of the system are various virtual machines 120 that may be used to run customer service applications. As previously described, these VMs may be based on Java™, Perl™, Ruby, and Python®, or other suitable programming language. In this example, program code and/or data may be stored in one or more persistent file systems 140 and/or databases 150. Internal connectivity may be provided by one or more VLANs 110, which may be configured to wire VMs and storage together, as specified by customer code and described in more detail herein.

In this example, platform 100 provides various methods to connect in to platform 100 from the Internet, and out of platform 100 to the Internet, illustrated as elements 101-108. For example, in some embodiments, the functionality of NAT 101 and load balancer 102 may be provided by dedicated hardware application switches sitting in the network. These resources may provide mappings between internal addresses and Internet addresses. In some embodiments, VMs may bind directly to Internet routable addresses, giving the customer maximum freedom in the kinds of protocols that the customer's service can use over the Internet. DNS functionality 104 may be similar to that of other types of hosting solutions. In the example illustrated in FIG. 1, virtual private network (VPN) functionality 103 may allow off-grid processes to act as first class members within an internal VLAN 110.

In the example illustrated in FIG. 1, the system call component, SysCall 105, represents functionality to allow off-grid applications to make "system calls" into the platform. This may allow off-grid applications to programmatically create and control system resources in the same way that on-grid VMs can. For example, such system calls may be included in self-deploying applications to create and populate resources in a virtual system and to initiate the operation of the virtual system and/or the resources thereof. In this example, Java™ Debug Wire Protocol (JDWP) functionality 106 may allow a customer to use a debugger running on his or her off-grid laptop or desktop computer and to connect to the platform over the Internet to debug his or her on-grid VMs. WebDAV functionality 107 may allow a customer application to move data back and forth between on-grid and off-grid file systems, in some embodiments. In such embodiments, each on-grid file system 140 may be exposed through the WebDAV protocol as a top-level connection. Note that there may be multiple ways to make use of WebDAV, in various embodiments. For example, some embodiments may make use of a programmatic API, such as that found in the Jakarta Slide software package. Other embodiments may use a client program or a WebDAV specific file browser. In still other embodiments, the operating system may support remotely mounting one of these file systems onto a local machine and operating on it as if it were a local file system. In this example, platform 100 also includes a communication portal 108, which may in some embodiments be a traditional Web portal. This portal may expose the same sort of system call functionality as SysCall 105, but for use by a human operator, thus allowing customers to manually administer and monitor their services from any Internet browser.

As illustrated in FIG. 1, platform 100 may provide one or more utilities and/or end-user services 130, in some embodiments. For example, platform 100 may include a Liberty identity provider or other authentication service, a high-level framework for automation of one or more development or deployment tasks, or a web server, in some embodiments.

A hosting system, such as platform 100, may also be described from the perspective of its software stack. In some embodiments, at the bottom of the stack are various APIs, including a low-level "system call" API. As described herein, this API may be targeted for Java™ Standard Edition (Java SE) applications, and may serve as the base API for programmatic system resource allocation and control. The same API may be usable both on-grid and off-grid, in some embodiments. The ability to use this API off-grid, along with the VPN support, may allow for interesting kinds of hybrid applications to be developed, i.e., applications that consist of a mixture of on-grid and off-grid components. An example of such a hybrid application is described in more detail below.

Note that not all developers may interact with the platform using the system call API. Instead, in some embodiments, such system calls may be embedded into higher-level functions, libraries, and/or frameworks (i.e., higher-level APIs) through which a developer may interact with the platform. Examples of such higher-level functions may include a function supporting the automated deployment of servlet containers, or the automated deployment and management of replicated services in a load balance configuration. Higher-level APIs supported by the platform may in some embodiments include existing software packages around which deployment and/or management automation have been wrapped to take advantage of the system. In other embodiments, the platform may support existing software packages to which targeted changes have been made internally to take advantage of the platform's architecture and resources. For example, in one embodiment, for back-end computation, the platform may include a compute server framework that implements the master-worker pattern and dynamically flexes the number of worker processes up and down to match what the actual computational load is on your service. In other embodiments, a higher-level library or framework may aid SaaS delivery by providing end-user management functionality that can be called by a customer's application and/or otherwise included as a resource in the customer's virtual system.

Another layer in the software stack of platform 100 may provide services, such as those illustrated in FIG. 1 as utilities and end-user services 130. For example, the portal 108 illustrated in FIG. 1 may allow service providers to deploy a number of tools such as forums, wikis, and help desks on-grid as part of their own service offerings for interacting with their end users. In addition, these or similar tools may be provided off-grid for interacting with developers who are creating services on platform 100. In another example, a centralized infrastructure or framework may be provided that allows service providers to manage the identities and access rights of the end users who are making use of their services. This may allow service providers to simply integrate calls to this framework into their services, so that they do not have to provide their own end-user identity solution to manage their end users.

Another layer in the software stack of hosting platform 100 may provide IDE support for both NetBeans™ and Eclipse®. In such embodiments, customers may be able to use their IDE to develop, debug, deploy, and monitor their on-grid applications. In such embodiments, what the application under development would be executing and being debugged on-grid, not being simulated off-grid (e.g., on the customer's laptop or desktop computer). The ability to be able to programmatically set up and tear down complete system environments very quickly may allow customers to have their production services running on the grid, but to still be able to set up and tear down independent development and test environments, while keeping the environments completely isolated from each other.

On the development and deployment platform described herein, customer code runs in processes on the grid. These processes may be similar to those running in a conventional single machine operating system, except that in some embodiments there may be a higher level of isolation between processes on the platform, so that even if two processes happen to be running on the same piece of physical hardware, they may not interfere with each other. In various embodiments, every process belongs to a process registration. The registration may be the resource used to describe, create, manage, and destroy processes. In the platform API, process registration resources may be represented by objects that implement a process registration interface. In some embodiments, at any given time, there may be at most one process associated with a given process registration. However, in some embodiments, a single process registration may be associated with multiple processes over time, allowing a sequence of processes to be linked together over time and to reserve resources even when no process is running. In some embodiments it may also be possible to use process registrations as "one shots", in which the registration is used to start a single process and is destroyed when that process exits.

Much of the information needed to create a process registration may be similar to the information needed to get a process running in a conventional operating system, e.g. command line, working directory, a source for standard input (stdin), a sink for standard error (stderr) and standard output (stdout), etc. The platform may also associate additional information with process registrations that are usually associated with hosts, such as the IP addresses at which a process should be reachable, and the network file system(s) to which it should have access. By associating IP addresses and file systems with process registrations instead of the host processes happen to end up on, the platform may in some embodiments be able to re-start processes on different pieces of physical hardware, provide higher level of isolation between processes, and give developers more control over the macro structure of their application.

In some embodiments, a process registration resource is a member of a broader class of grid resources that can be allocated by customers. Other resources may include networks, IP addresses, network file systems, etc. In various embodiments, every resource has an immutable name that is specified by the creator of the resource. Every resource may also have an immutable grid-generated universally unique identifier, or UUID. In general, when a relationship needs to be set up between two resources, it may be done using the UUIDs of the referenced resources. Note that while customer programs may use the platform API to allocate and manage resources, this may also be done "by-hand" using various interactive tools, such as a NetBeans Plugin, or a dedicated grid accessing application, in some embodiments. In still other embodiments, platform resources may be allocated and managed using methods included in a utility package, such as one that includes various Apache Ant tasks.

While it may be possible to create a process on the platform with no network connectivity, most processes will be accessible through at least one IP address. One way to create a network accessible process may be to bind a process directly to an external IP address, in some embodiments. This may allow the process to accept packets from, and to send packets to, hosts on the Internet. External addresses may in some embodiments be allocated using a platform API method. In some embodiments, if there are multiple processes in a customer application, an external address may be allocated for each process. In other embodiments, a network may be created to connect them together. Each network may define a private IP-subnet from which internal IP addresses can be allocated from, and all the process bound to IP addresses allocated from the same network may be able to send and receive packets to/from each other. Note that a given process may be bound to multiple IP addresses, in some embodiments. For example, a process may be bound to one or more external address and may be able to connect directly to machines on the Internet, and/or it may be bound to one or more internal addresses, allowing it to communicate with on-grid processes that are not bound to external addresses. Note also that customers and/or customer accounts may have multiple networks allocated to them. The networking options described above may in some embodiments allow a number of possible network topologies. For example, multiple applications may be placed on the same network, each application may have its own network, or a single application may be broken up into tiers by using multiple networks for the application. Provisioning may in some embodiments be automated by programs using the platform APIs and/or by using tools such as a NetBeans plugin. While it may be possible to create a process that is not associated with any external or internal IP addresses, in some embodiments, all processes are bound to an IPv6 address on the grid's internal service network so they can access the various network services offered by the grid (e.g. file systems). This service network may not be usable to communicate with other customer processes running on the grid.

In some embodiments, the platform may provide network setting resources that perform various mappings between external and internal IP addresses, allowing a process that is bound only to internal IP addresses to have connectivity to the Internet. For example, in some embodiments, L4 and/or L7 virtual service network settings may provide load balancing (with optional SSL termination) of inbound connections to a given external address/port pair to a list of internal address/port pairs.

Note that, in some embodiments, processes that are either bound directly to an external IP address, or are bound to an internal address that is in turn associated with an external IP address via a static NAT rule, may be accessible from all hosts on the Internet and on all ports. While such a process is running, the grid implementation may have network services, such as NFS client services, bound to certain ports on the IP addresses being used by the process. These services may also be accessible from the Internet. In some such embodiments, any process that is bound to an external address, or to an internal address that is mapped to an external address via a static NAT setting, may associate packet filter rules with that address that restrict external accessibility to the particular services that are intended to be externally accessible.

In general, on-grid processes may have access to a local file system (e.g., one that includes /tmp and /var/tmp directories), but the capacity of the local file system may be limited and may not be accessible to other processes. In some embodiments, any data written to the local file systems may be deleted when the process exits. Therefore, any files that need to be shared across multiple processes (including multiple processes started from the same process registration), that need to be present when a process starts (e.g., class files), or that need to persist after the exit of a process may be stored in a grid managed network file system. Each grid managed network file system may have a life cycle that is independent of other resources in the system, including processes (though in some embodiments a file system that is referenced by another resources may not be deleted until that reference is removed). In some embodiments, every process configuration includes a list of file systems that must be mounted before the process is started, and an indication of where those file system should be mounted. Typically, the customer code (e.g. jar and/or .class files, Perl™ scripts, etc.) for the process itself may be maintained in one or more of these file systems. As previously noted, code (and other data) may in some embodiments be placed in a grid managed network file system from off-grid using WebDAV. In some embodiments, WebDAV may also be used to fetch files from file systems and to create or delete sub-directories.

In some embodiments, file system resources may be created through the platform API, while in others they may also be created using various tools such as the NetBeans plugin, a stand-alone GUI, or various Apache Ant tasks. In some embodiments, a given customer account may have multiple file system resources. In some embodiments, creating, destroying, cloning, and taking snap-shots of file systems may all be relatively cheap operations. A given process may mount multiple file systems and, conversely, multiple processes may mount the same file system, in various embodiments. As a result, there may be number of options for an application's file system architecture. For example, a single set of file systems may be shared across multiple applications, or a unique set of file systems may be created for each deployment. Shared code and data may be placed in a single file system that is mounted by all the processes in a given application, or every process may be given their own copy-on-write clone. In some embodiments, each process that needs to write data may have a sub-directory in a common file system, or each process may be given its own file system. Applications may provision their own file systems, or provisioning may be an administrative task carried out by human operators, in different embodiments.

In some embodiments, a requirement for creating a process registration may be that a process configuration is provided. When a request to create a process for the registration is received, the configuration may used to determine what environment is required by the process and how it should be started. A process configuration may, in some embodiments, include one or more of the following configuration parameter fields:

runtimeEnvironment: This parameter may specify the language runtime library that the process requires (e.g., Java™, Python®, or Perl™).

commandLine: This parameter may specify the command line required to start the process, and may or may not include the actual command to use (which may be inferred from the runtimeEnvironment). The value of this field may be a String array and may undergo no further tokenization. For example, array element values like "-jar foo.jar" may be interpreted as a single command line argument. In another example, for JVM command line options like -jar and -classpath, the command line may need to be constructed with something like String[ ] {"-jar", "foo.jar"}.

fileSystems: This parameter may specify one or more file systems to be mounted and where they should be mounted.

networkAddresses: This parameter may specify one or more IP addresses that the process should be able to use (and implicitly networks on which the process will be located).

workingDirectory: This parameter may specify an absolute path to resolve any relative paths, which may include relative paths used in the commandLine. Typically, this parameter may point into one of the mounted file systems.

Once a process configuration has been created, it may be used to create a process registration resource. Process registration instances may be created using the platform API, in some embodiments. On-grid programs may obtain a reference to a grid object for the grid on which they are running by getting their process context object and calling a method of the platform API, in some embodiments. On-grid programs may obtain their process context object by calling another method of the platform API. Off-grid programs can get a reference to the development grid by calling an API method, or using another platform utility, in different embodiments. Once the program has a grid object it may call the create API, providing a process configuration and a name, to create the process registration. In some embodiments, the name must be unique with respect to any other existing process registrations created using the same account. The use of names may support re-try of process registration creation when creation fails. In some embodiments, names may be used to look up process registrations created by other programs.

Once a process registration has been created, a "start" method of the platform API may be called to get a process running. Other methods may be called to kill a running process. For example, in some embodiments, different methods may be called to shut down a method gently (e.g., by reaching a clean stopping point, and/or cleaning up loose ends) or forcefully. In some embodiments, start and stop methods may take a Boolean argument whose purpose is to handle certain failure/retry scenarios (e.g., returning false under certain conditions). An exit action field of a process configuration (described in more detail later) may in some embodiments control what happens when a process exits. In some embodiments, by default, process registrations are maintained after the process exits. This may allow the exit value of the process to be collected and/or a second (or subsequent) process to be started from the registration by calling the start method again. Alternatively, the exit action may be set such that a new process will be automatically started when the current one exits or such that the process registration is deleted after the process exits. Once a process registration resource is no longer needed, a destroy method may be called to remove the process registration resource from the system. In some embodiments, calling a destroy method may also kill any running processes associated with the registration.

In some embodiments, the platform may support the use of an optional file that allows a customer to maintain the necessary information for login information to the grid. In such embodiments, other tools and components of the platform may take advantage of this file. The presence of valid data in this file, when used in conjunction with off-grid utilities that are aware of it, may provide the user with the conceptual equivalent of a single sign-on, in that, if present and fully formed, user prompting may not be required for grid access. For developers of applications, the platform API may contain the appropriate API to handles most of the work necessary to support use of this sign-in file.

For a sign-in file to be honored by enabled applications, certain conventions may need to be followed. For example, in one embodiment, the file must be placed in the user's home directory. The sign-in file may adhere to the standard Java™ property file format in which entries consist of a series of key value pairs. For example, in one embodiment, the sign-in file may include any or all of the following three keys:

gridURL: The URL of the Grid to be accessed.
customerID: The customer's login identifier.
password: The customer's login password.

Typically, if a key/value pair is not present, the application accessing the sign-in file may prompt the user, via a GUI, to supply the necessary missing information at runtime. As an example of the structure of the file, assume a customer named SeventiesBach has a password of Dai$yDuke$0fHazard and wishes to access a grid instance of grid.PlatformName.net. In this example, a complete set of entries in the sign-in file may appear thus:

```
// This is an example sign-in file
gridURL=https://grid.PlatformName.net
customerID=SeventiesBach
password=Dai$yDuke$0fHazard
```

The use of the development and deployment platform described herein may be further illustrated by way of an example application deployment. One such deployment is illustrated by the flow chart in FIG. 2. Note that the operations illustrated in FIG. 2 for deploying an application on the platform may in some embodiments be invoked by the execution of program code in an off-grid application (e.g., a manager application or launcher application), while in other embodiments, these operations may be initiated by a customer using a command-line interface (e.g., through a GUI, web browser, or other portal provided by the platform).

Figure 2:
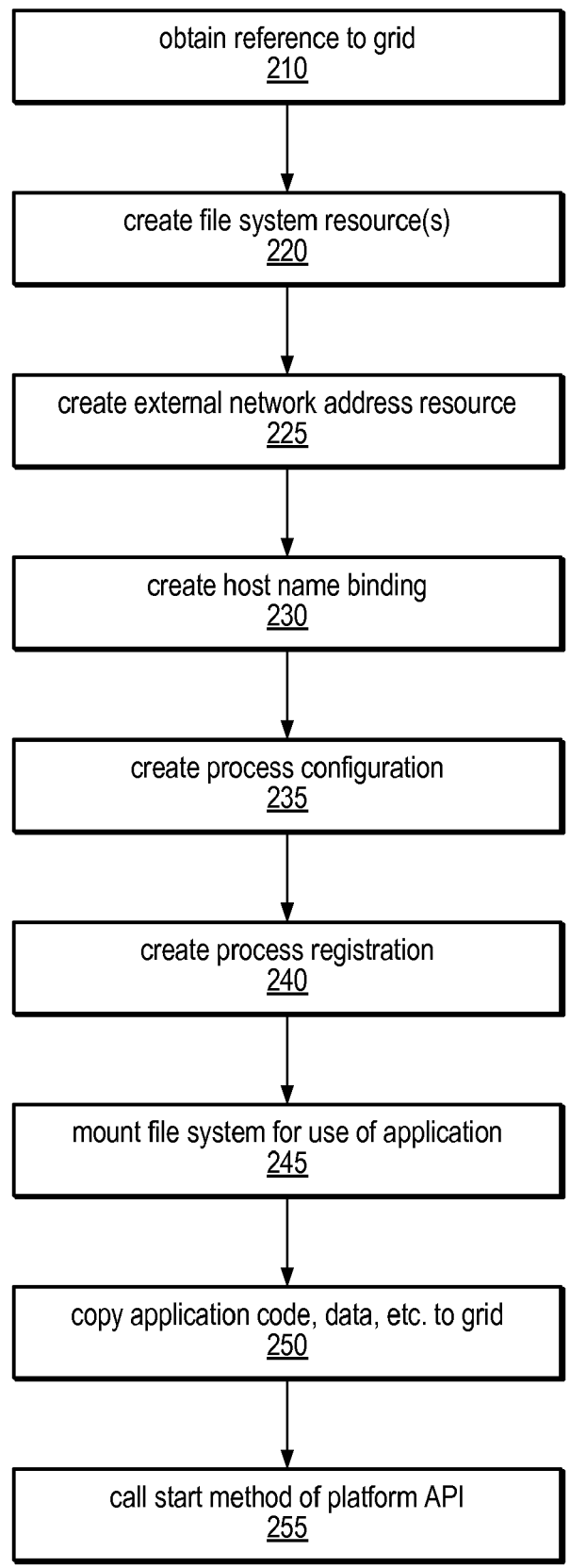
FIG. 2 is a flowchart illustrating a method for deploying an application to a development and deployment platform, according to one embodiment.

In the example illustrated in FIG. 2, deployment begins by obtaining a reference to the grid, as in 210. In some embodiments, obtaining the reference may involve calling a platform API or utility to provide handshaking between the customer (or the customer's off-grid code) and the platform. The handshaking protocol may in some embodiments include authentication of the customer's credentials (e.g., their customer identification and/or information such as that included in a sign-in file, as described above). The utility may, in response, provide a proxy through which communication with the grid is made possible.

As shown in FIG. 2, the next few operations in a deployment may create the various resources of the customer's virtual system from the resource pool provided by the platform. In some embodiments, an off-grid launcher may be executed to create on-grid resources to be used by components deployed on the grid. These on-grid computational components may be deployed by the off-grid launcher, which in some embodiments creates grid resources, moves code and/or data to the grid, and makes the appropriate platform API calls to start the execution of the grid components. Other approaches to creating resources and deploying application components include the use of a platform Netbeans Plugin, or the use of other utilities, such as Ant tasks supported by the platform.

The resources needed to deploy a customer application, in this example, include:

A file system to provide storage for the applications bits and dependencies

An external network address to make the application available to off-grid clients A process registration to provide instructions to the grid on how to run our on-grid computational element A host name binding to perform DNS mapping necessary to provide access to the application via a human-friendly URL Note that in some embodiments, the first three resources listed (i.e., at least one storage resource, an external network address, and a process registration) may be required grid resources for any deployed application. The last (a host name binding) may be an optional, but highly desirable, resource that may improve the user experience of the deployed application.

Creating storage resources, specifically a file system, may in some embodiments involve execution of a method that queries the grid for the existence of the required file system. If the file system is present, it may be reused. If not, the method (or another method) may create it in preparation for application deployment. Creation of storage resources is illustrated as 220 in FIG. 2. Creation of an external network address, as in 225, may involve execution of a method that allocates a network address from the platform to the grid and adds the UUID of that network address to a collection addresses that are to be bound to the on-grid process at runtime to provide external connectivity for the application.

As shown in 230 of FIG. 2, a host name binding may be created to allow end users of the application to access the application through a user-friendly URL. In some embodiments, it may be simple to create a DNS mapping for the application through built-in platform support for host name bindings (e.g., may executing the appropriate platform API). The final resource needed to deploy the application to the grid, in the example, is a process registration resource. This resource describes a computational component to the grid. As described above, in order to create the process registration, a process configuration resource must be created (or otherwise obtained), as in 235. The process configuration resource may include information needed to execute a process on the grid from the process configuration, describing its runtime, network connectivity and file system requirements, for example. As shown in 240, the process registration may be created (using the process configuration) to run a Java-based application bound to the external network address previously allocated (at 225).

In the example illustrated in FIG. 2, once the required on-grid resources have been created in the customer's virtual system, deployment may include mounting any file systems that were created for the use of the application, as in 245.

As shown in FIG. 2, deploying an application on the grid may include copying the application code itself to the grid, as in 250. For example, the application code may be copied into one or more files on the file system(s) mounted at 245. There may be a number of ways in which to copy application code to the grid for execution. In some embodiments, one or more methods for copying application code to the grid may rely on the platform's support for the WebDAV protocol. For example, WebDAV support may be built into the platform (e.g., as a plugin), a WebDAV client may be supported in the virtual system, the operating system may support file browsers with innate WebDAV support, or a programmatic WebDAV API may be used move the files, in different embodiments. Note that in addition to the application code itself, any resources on which the application depends (e.g., data or meta-data), may also be copied to the grid. Data or meta-data may be stored in the same file system as the application code, or in one or more other file systems in the virtual system, in different embodiments.

With all resources in place and the application and its dependencies now safely on the grid, the application may be launched. In the example illustrated in FIG. 2, this may involve invoking a start method of the platform API on the process registration resource proxy, as in 255. In some embodiments, the grid will use information in the process registration's associated process configuration in attempting to launch the process. As part of the start, the grid may in some embodiments perform checks to avoid clashes in the network settings of the candidate process and other processes already running on the grid. If conflicts are found, the start operation may throw an exception indicating the nature of the problem, otherwise the call may return when the process has been successfully started on the grid. Note that, as described above, the particular grid node chosen for execution of the application may be determined by the platform, but in some embodiments, customer-specified constraints may be taken into account in selection of the grid node. For example, the system may use the instructions in the process registration concerning the runtime requirements of the process to pick a grid node for execution. Dependent on these requirements, the process may or may not share the computational node with one or more processes from the same and/or different customers, in some embodiments.

After running the application and/or observing its behavior, it may be desirable to shut down the application and clean up any resources that were created on the grid for its use (not shown). In some embodiments, the platform may provide a teardown utility (e.g., an Ant task) to do just that. Such a task may be configured to start an orderly shutdown of the application and reclaim all the resources it was using. In some embodiments, this may be done by using a client API to ask the grid to perform the cleanup operations. If the teardown utility fails for some reason, the command may in some embodiments be issued again and the cleanup may resume where it left off.

As previously noted, the platform may support the development and deployment of applications that implement long-running Internet services on the grid. In the example illustrated in FIG. 2, if the customer application to be executed on-grid is to implement such a service, it may in some embodiments include a server portion (e.g., a server which starts an embedded servlet container) and an end-user application that will be hosted in the embedded servlet instance. In such embodiments, the server may be made available to external clients via the external network address resource whose creation was detailed above (i.e., the network address which is bound directly to the process in its process registration). The server may also set up (i.e., create and/or populate) a data source (e.g., embedded database) and make it available to the end-user application as a resource. In some embodiments, the data source may be made available using the Java™ Naming and Directory Interface (JNDI). In this example, the start method invoked to launch the service may include a command-line for the on-grid process. This command-line may comprise information about the server main class, the port on which the embedded servlet container should listen for service requests, the location of a web interface application through which the service may be accessed, an application context name for the end-user application, and/or other information usable in configuring and executing the server and the end-user application, according to various embodiments.

As described herein, the system resources that may be available on a hosting platform include, but are not limited to: processes, file systems, databases, internal networks, VLANs, IP addresses that are either on internal networks or on the Internet, multiple forms of Internet connectivity, host names, and the mapping of host names to IP addresses. In various embodiments, the basic operations common to all resource types may include a create resource operation, a find resource operation, a reconfigure resource, and a destroy resource operation. These basic operations are illustrated by the flow chart in FIG. 3, which illustrates the life cycle of a given resource, according to one embodiment. In this example, it is assumed that the operations described are included in customer code executing on-grid, although in other embodiments this code may be executed off-grid through the use of the system call API. As illustrated at 300, the customer code may include an operation to create a resource in the customer's virtual system. When customer code creates a resource, it may give the resource a name (e.g., a name specified by the customer in the code and/or created by the customer code itself). Resource names may be used both a convenience and a means for avoiding lost resources in the event of certain kinds of failures. In some embodiments, resource names may include two components: an identifier of the customer that created the resource, and a customer supplied string. Note that, in some embodiments, the same name may be assigned to two different resources if they are of different top-level types (e.g. a file system vs. a network setting), or if the two resources have disjoint lifetimes. In some embodiments, each resource type may have a separate name space and/or each customer may also be associated with an independent name space, so that it may be easy to avoid collisions. As previously noted, each time a resource is created, the system (e.g., the platform or the grid) may assign a universally unique identifier (UUID) to that resource and all cross references within resources may be done by UUID rather than name. In some embodiments, no two resources will ever have the same UUID, and UUIDs may never be reused. However, a developer may be allowed to reuse names over time to reference different resources (i.e., different resources with non-overlapping life cycles). Note that, in general, the grid may not allow a resource to be de-allocated if the configuration of another resource makes an explicit reference to it.

Figure 3:
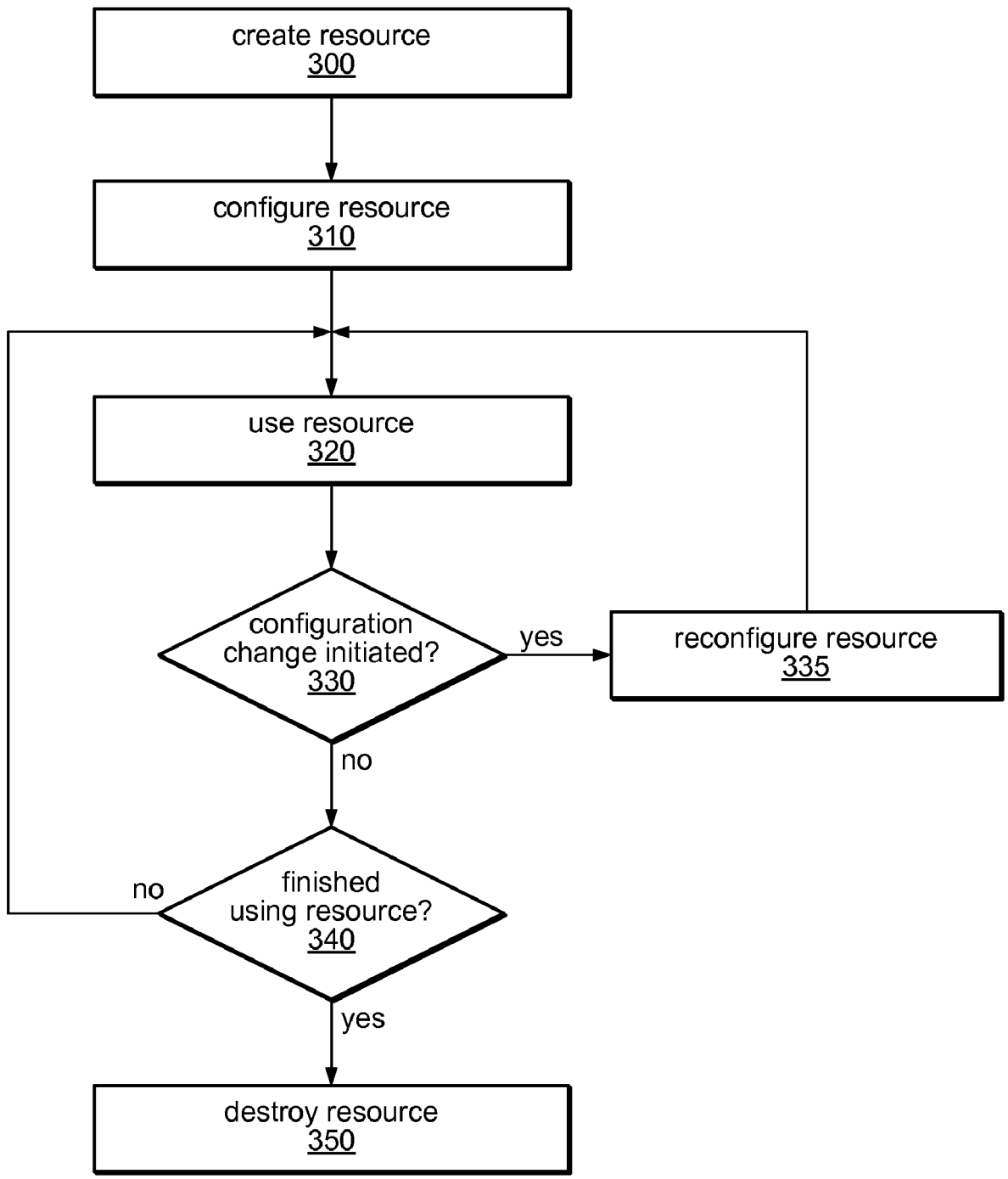
FIG. 3 is a flowchart illustrating the lifecycle of a platform resource, according to one embodiment.

As illustrated in FIG. 3, the resource may also be given an initial configuration (also specified in the customer code or created by the customer code), as in 310. In various embodiments, the resource may be configured as part of the creation operation and/or at any other time after its creation. In some embodiments, the contents of the configuration may be specific to the particular type of resource that is being created. Several examples of configuration information for different types of resources are described in more detail below.

As shown in FIG. 3, a configured resource may be used by the customer code, as in 320. For example, data may be stored to a file system or database resource, or a computation may be performed by a VM in the customer's virtual system in response to a start operation directed to a process resource. In some embodiments, in order to use a resource in the virtual system, it may be accessed using a find operation. In different embodiments, a resource may be found by matching on name, a UUID, the contents of its configuration, or the contents of meta-data associated with the reference.

As illustrated in FIG. 3, at any time while the resource is in use, its configuration may be dynamically changed by the customer code or by another process authorized to re-configure it (e.g., an off-grid process in a hybrid application, or a system utility included as a resource in the customer's virtual system). If a configuration change is initiated, shown as the positive exit from decision block 330, the resource may be reconfigured, as in 335, and execution may continue, shown as the feedback loop to 320. If no configuration change is initiated, but the code finishing using the resource (e.g., if temporary storage is no longer needed, or if a computation is completed), the resource may be destroyed (i.e., removed from the virtual system). This is illustrated as the negative exit from 330, the positive exit from 340, and block 350. Note that in other embodiments, a resource may not be destroyed after being used, as described in more detail below. Until the code is finished using the resource, it may continue to be used, shown as the negative exit from 340 and the feedback loop to 320.

As noted above, configuration options for different resources may vary depending on the resource type. For example, configuration of a process may include the specification of some of the same configuration options as configuration of a database, and specification of some configuration options that are different from those associated with configuration of a database. In various embodiments, configuring a process may be performed using customer code (e.g., through the system call API), or may be controlled over the command line. In some embodiments, the program run to configure a process may be an enum that specifies what virtual machine type is needed to run, e.g., one based on Java™, Perl™, Ruby, and Python® or another suitable language.

Figure 4:
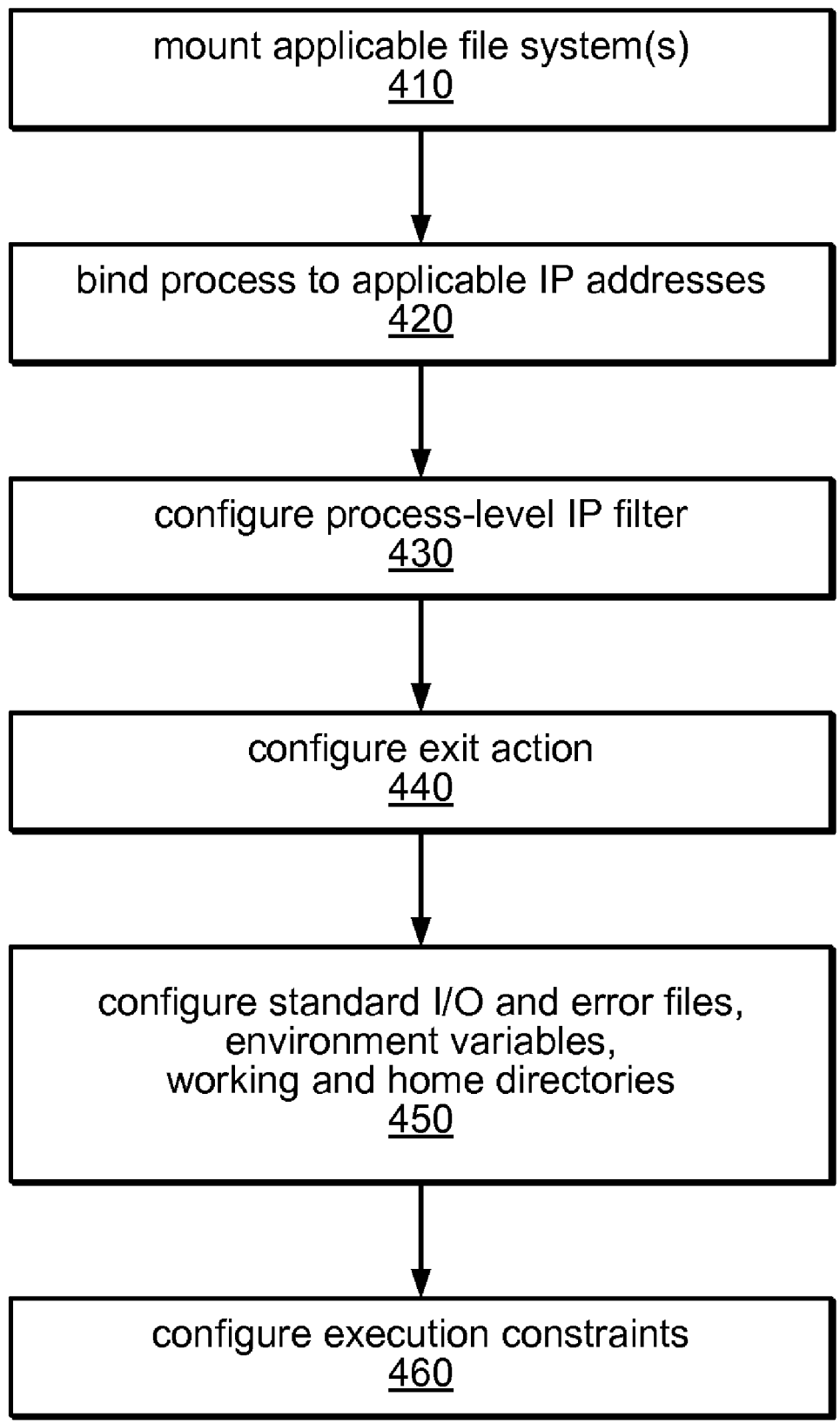
FIG. 4 illustrates a method for configuring a process resource, according to one embodiment.

FIG. 4 illustrates a method for configuring a process resource, according to one embodiment. Note that in some embodiments, the hosting platform described herein may insulate the customer and/or customer code from operation system details and may provide a high degree of isolation between VMs. In such embodiments, several configuration parameters that might normally be thought of as part of the operating system environment may instead be included in the configuration parameters of a process resource. One of these may be which file systems to mount, and where and how to mount them. Specifying these as part of the process configuration may in some embodiments facilitate restricting the process to seeing only the file systems that it needs to see. Therefore, as illustrated in FIG. 4, process configuration may include mounting applicable file systems and/or databases for use by the process. This is shown at element 410.

Another type of configuration parameter that may be included in process configuration (rather than as part of the operating system environment) may specify one or more IP addresses that the VM should be bound to. Binding the process to these IP addresses is shown at 420 of FIG. 4. Note that in various embodiments these IP addresses may be accessible on one or more internal VLANs or on the Internet. In some embodiments, the process may be bound to multiple IP addresses on the same network.

A third type of process configuration parameter that may normally be thought of as part of the operating system may specify firewall rules. In other words, the platform may support the use of process-level firewall rules in addition to, or instead of, generally applicable firewall rules. Configuring process-level firewall rules may allow customers and/or customer code to selectively block traffic to other addresses and ports on the networks to which their processes are connected, providing an IP filter. This is shown as element 430 of FIG. 4.

In this example, a process configuration may include configuring a specified exit action, as in 440. The exit action tells the system what to do when the process terminates. In one embodiment, there may be three different exit action modes. In this example, specifying a "park" mode may cause the system simply to leave the resource in stasis after the process terminates. In this case, it may be up to the customer and/or customer code to determine what to do with that resource later (e.g., to restart it or destroy it later). Another exit action mode, specifying a "restart" mode may cause the system to automatically restart the process whenever it terminates (e.g., whether it completes normally or crashes), alleviating the customer and/or customer code from having to figure out how to do that. Finally, in this example, specifying a "destroy" mode may cause the system to destroy the resource when the process terminates. This mode may be convenient in the case of customer code that includes one-shot computations that are dispatched to a VM, executed, and forgotten. Note that in some embodiments, the customer and/or customer code may not have control over where in the grid the process is physically going to run, but every time it runs (e.g., every time it is started or restarted) it will have the same environment. In other words, it will have the same file system mounts; it will be on the same networks connected using the same IP addresses, etc., and all of that may be handled automatically by the platform.

Other process configuration parameters may specify the standard I/O, working and home directories, and environment variables to be used by the process, as in 440. These may be analogous to similar operations in other computing systems, in some embodiments.

While the customer may not be able to control physically where their processes run, they may in some embodiments be able to impose a few constraints on the system about where their processes run, as in 460. For example, process configuration parameters may specify whether a process may share CPU cycles with other processes, (e.g., at a cheaper price), whether the process has exclusive access to some number of CPU cores, or how much memory is needed for execution. In some embodiments, configuration parameters may specify a set of processes that are required to run on mutually exclusive physical boxes for failure independence (e.g., a non-collocation constraint), which may serve as a building block for fault tolerant systems.

As noted above, once a process has been created and configured in a customer's virtual system, operations may be performed on that process, either by code executing on-grid or by off-grid code executing a system call to access the grid. Process-specific operations supported by the platform may include a start operation and a stop operation. In some embodiments, a process may be stopped in more than one way. For example, in one embodiment that uses Java™ VMs, a process may be stopped in a way that lets Java shut down hooks run or not. Other process operations may also be specific to the particular VM that is being used. For example, for a process based on Java™, the platform may support an operation to generate a thread dump, allowing the customer and/or customer code to get the current state of a process. The current state may in various embodiments reflect one or more of: whether or not the process is currently running, how many start attempts have been made to run that process, what the outcome was from the last process execution, whether it exited normally, whether it was killed by an internal or external signal, or whether it died due to some other event, e.g., a node failure. In some embodiments, if the system has been configured to automatically restart a process (e.g., a customer's service application) and that restart repeatedly fails, the system may put the service into a "stuck" state, which may be detected by a monitoring function (e.g., through event monitoring), so that the process may be flagged for exception processing (e.g., through event notification).

In some embodiments, the platform may support operations to enable waiting for and receiving event notifications on state changes, so that the customer and/or customer code may monitor and control the process according to the observed state changes. For example, in some embodiments the creation and/or destruction of resources may constitute events for which an application may request notification through the API. In another example, the platform may be configured to monitor the virtual system during execution of the customer's code to detect an instance of a given system event, and may provide an indication of the system event upon detection (i.e., an event notification) to the customer and/or customer code. In some embodiments, in response to receiving such a notification, the customer and/or customer code may modify the configuration of the virtual system. For example, if the system event represents a change in resource usage in the virtual system (e.g., an increase or decrease in resource usage, a request for services requiring additional resources, or the completion of a task for which a resource was previously created), the customer and/or customer code may destroy a platform resource in the virtual system or may create an additional platform resource in the virtual system, in response to the event notification.

Figure 5:
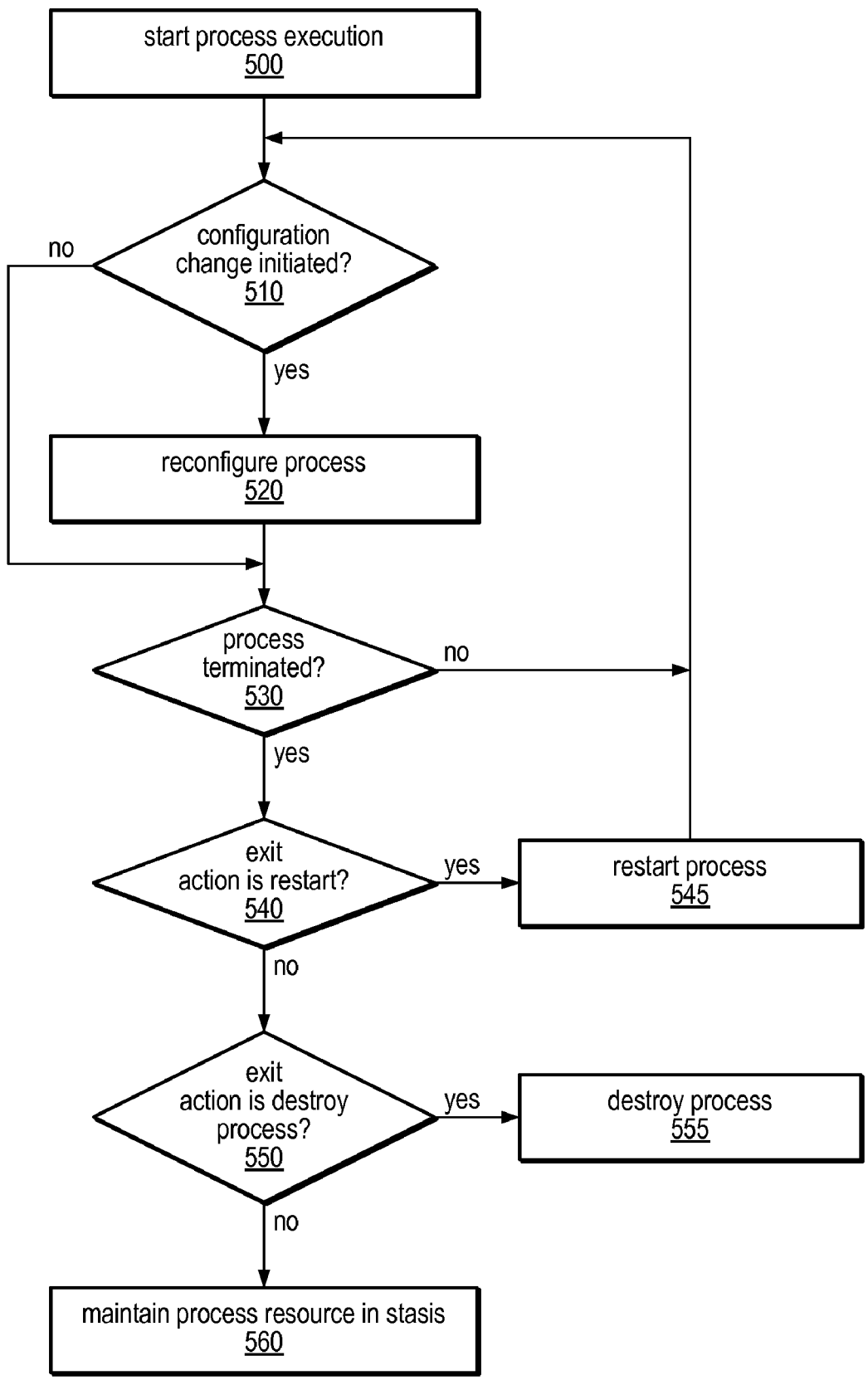
FIG. 5 illustrates a method for executing a process on a hosting platform, according to one embodiment.

FIG. 5 illustrates a method for executing a process on a hosting platform, such as that described herein, according to one embodiment. In this example, a start operation initiates execution of an on-grid process that has already been created and configured, as in 500. At any time during its execution, a configuration change may be initiated by the customer application (e.g., as explicitly coded, or in response to a monitoring operation and/or event notification). If a configuration change is initiated, shown as the positive exit from decision block 510, the process may be dynamically reconfigured (i.e., while it is executing), as in 520. After reconfiguration, or if no reconfiguration is initiated, execution continues until something causes the process to be terminated (e.g., it may complete normally, or may be terminated due to an exception, an event, or a failure of some kind). This is illustrated as the negative exit from decision block 530 and the feedback to 510.

If the process is terminated, shown as the positive exit from 530, the configured exit action may determine how the system responds. For example, if the exit action configuration parameter specifies a "restart" mode, shown as the positive exit from 540, the process may be restarted, as in 545 and the feedback loop to 510. Alternatively, if the exit action configuration parameter specifies a "destroy" mode, shown as the positive exit from 550, the process may be destroyed following its termination, as in 555. Otherwise, shown as the negative exit from 550, the process resource may be maintained in stasis until the customer or customer code takes an explicit action to restart, reconfigure, or destroy it, as in 560.

Note that in some embodiments, as a consequence of insulating the developer from operating system and hardware details so that they may maximize their own operational efficiencies, native libraries may not be supported. In addition, in some embodiments, it may not be possible to create new local processes through traditional local interfaces (e.g., in an implementation that is based on Java™, there may be no local Runtime.exec). In such embodiments, the only exec in the system may be what the customer and/or customer code can access through the system call API. In such embodiments, as previously noted, the system may control where any new process is going to run. As a consequence, these embodiments may not support the use of standard I/O pipes between pairs of processes, and the developer may have to use an alternate form of network communication to communicate between them, e.g., using a Remote Procedure Call (RPC), Remote Method Invocation (RMI), shared files, a web service API, etc.

As previously noted, the hosting platform described herein may support various file systems and databases for persistent storage of a customer's program code and/or data. In one embodiment, file systems are implemented using ZFS, the Zettabyte File System in Solaris™, and VMs access these file systems over NFS. These file systems may be implemented in several styles, including a standard read/write file system. In some embodiments, a ZFS implementation may support the creation of a read-only snapshot of a file system, and that snapshot may share disk space with the original file system for any files that continue to remain unmodified in the original file system. In such embodiments, the snapshot itself may be read-only and may not change over time.

File system configuration may be similar to process resource configuration, but may include a different (possibly overlapping) set of configuration parameters. For example, a file system configuration may specify one or more a parameters that cause the system to impose a reservation or a quota on a file system. Another configuration parameter may specify one or more access control mechanisms, such as whether the file system may be accessed by other processes, whether it may be mounted by other customers' processes, and whether it may be accessed via WebDAV. For example, in some embodiments, file systems may optionally be shared with other customers and the customer and/or customer code can control both which other customers can use their file system(s) and how these other customers can mount them (e.g., they may restricted to read-only mounts).

Once a file system resource has been created and configured, it may be operated on by customer code (e.g., code executing on-grid and/or customer code executing off-grid and accessing the file system through the system call API). In various embodiments, the file system may support standard read and/or write operations, depending on its configuration. As noted above, some file systems, including some ZFS implementations, support snapshot operations. In such embodiments, other file system operations supported by the platform may include rollback of one or more base files or clones to a most recent snapshot (providing a very efficient "undo" operation), backing up an entire snapshot or a delta between two snapshots to a file in another file system, and/or restoring file(s) or a file system from a backup. Note that since ZFS is designed to support a large number of file systems from a single storage pool efficiently and reliably, it may in some embodiments be very cost-effective to support these operations in a platform that uses ZFS.

In some embodiments that support snapshot operations, a file system operation may create a copy-on-write clone of that snapshot and that clone may share disk space with the snapshot for any files that remain unmodified in the clone. In other words, the snapshot and clone may initially share the same disk space, but as edits are made to the clone file system, copy-on-write occurs and the clone gets its own private data for the changed portions, while sharing as much content as possible with the snapshot itself. An example of the use of such clones may include a system in which a number of replicated file systems all share content that is largely the same, but may have some differences.

Figure 6:
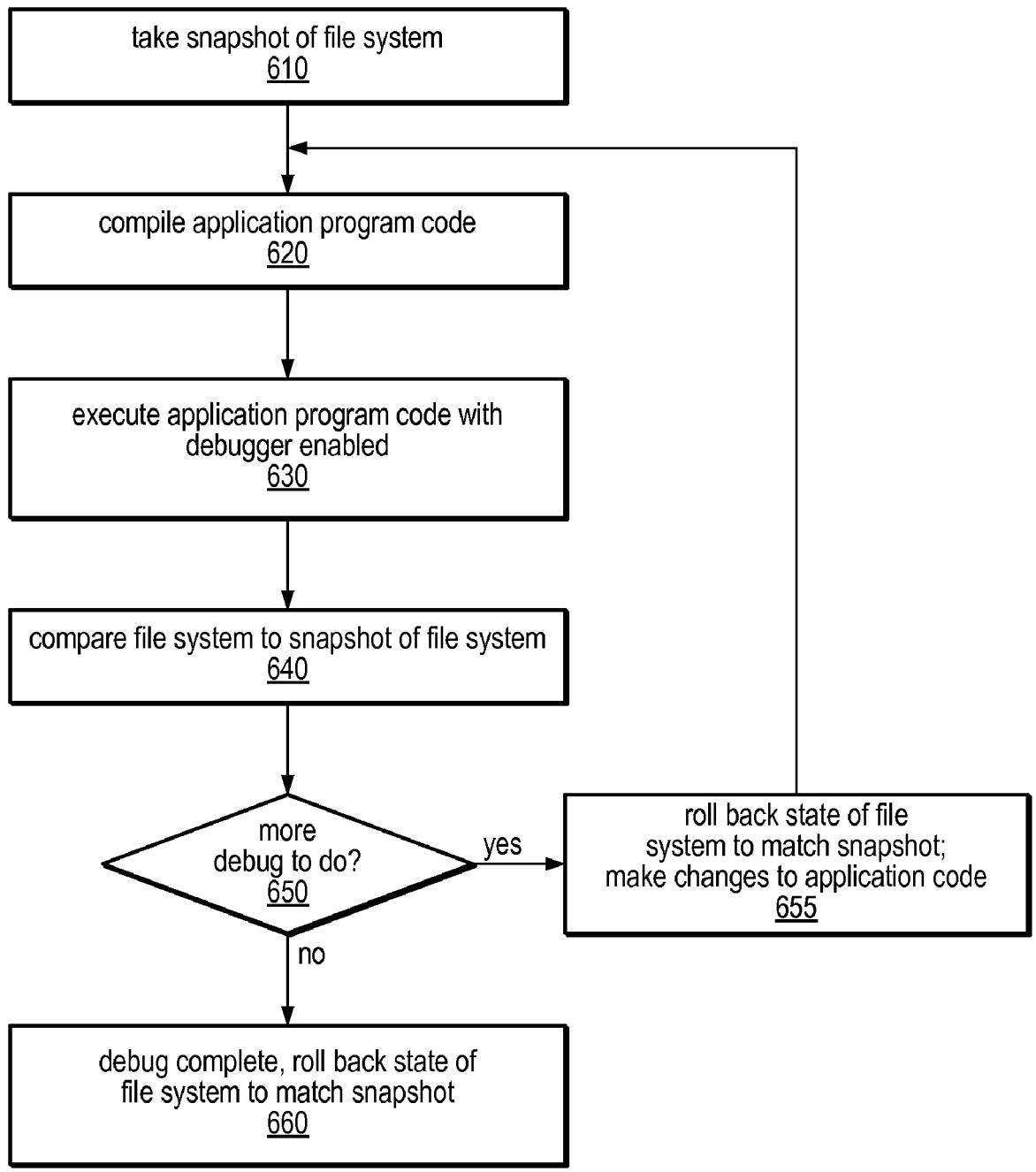
FIG. 6 illustrates a method for using snapshots in a debugging task, according to one embodiment.

In embodiments in which a file system supports snapshots and/or cloning, the snapshot and rollback operations may be used by a customer in performing various development tasks, such as debugging program code that makes changes to the file system. One method for using snapshots in a debugging task is illustrated in FIG. 6. In this example, before beginning a debug session, a snapshot operation may be used to capture the current state of the file system, as in 610. The code may then be compiled, as in 620, and executed, as in 630. As shown at 640, the new state of the file system (e.g., the state resulting from execution of the code being debugged) may be compared to the snapshot to see what has changed. If the changes are acceptable and/or what is expected, debug may be complete, shown as the negative exit from 650. In this case, a rollback operation may be used to restore the state of the file system to match the snapshot taken before the debugging session, as in 660. If not, shown as the positive exit from 650, a rollback operation may be used to restore the state of the file system to match the snapshot, and/or changes may be made to the application code being debugged in an attempt to correct any errors, as in 655. In other words, for each iteration through the compile-edit-debug cycle, a rollback operation may be used to restore the state of the file system to the snapshot so that it is ready for the next debug cycle without the customer or customer code having to manually determine what has changed in reverting the file system. In this example, the debugging session may continue, shown as the feedback loop to 620, and the operations illustrated in 620-655 may be repeated until the application code has been successfully debugged.

Note that in some embodiments, supported file system operations may include reporting operations, such as an operation to report current disk usage of a file system resource. As is the case with operations of the other resources of the customer's virtual system, all of these operations may be programmatic (e.g., they may be initiated by program code included in a customer's application or in a managing application, utility or service application included as a resource in the customer's virtual system) and may be performed at runtime (i.e., dynamically, during execution of the customer's application).

Another type of resource that may be included in a customer's virtual system is a database resource, e.g., a PostgreSQL database, or any other suitable database. In systems that include one or more PostgreSQL databases, configuration parameters may specify the IP addresses that each database binds through. These may be the addresses that, for example, a JDBC™ driver will connect to when accessing the databases. Other database configuration parameters may set storage reservations and/or a quota on a database's storage, or may specify access control parameters, such as the IP addresses of other processes that are allowed to connect to the database on the networks to which the database is connected.

Note that in some embodiments, the customer may include his or her own database (e.g., a pure Java™ implementation of a database) and may use NFS file systems for their persistent storage. In such embodiments, a customer database may be embedded in their application program code or may be run as a separate process in the virtual system. In other embodiments, programmatically creating one or more database resources with local storage (e.g., a PostgreSQL database) using the hosting platform's resource pool may be advantageous to the customer, since the platform may manage the complex installation of those databases rather than the customer having to do so.

As described above, internal connectivity resources (i.e., internal networks in the customer's virtual system) may include one or more VLANs. In some embodiments, a basic configuration parameter of the VLAN may specify the number of IP addresses that may be allocated to the VLAN. Other configuration parameters may specify access control options. For example, in some embodiments, a VLAN in one customer's virtual system may be shared with another customer, and the access control parameters may specify the customers who are allowed to allocate and free addresses on that network.

The basic operational model for an internal network may include: creating a network, allocating an IP address out of that network, and binding a process or a database to that IP address. In some embodiments, each VLAN may be isolated and independent of every other VLAN, so that each VLAN is its own independent multicast and broadcast domain. In such embodiments, processes may exist on an internal grid IP network where they can only send packets to each other. In some embodiments, there may be no routing at all between VLANs. In such embodiments, the only routing that occurs may be that which is a byproduct of setting up access out to the Internet (described later). Instead of using explicit routing, if customers want to allow connectivity between multiple networks, they may put processes and databases in place and then bind them to addresses on more than one network.

As described above, a hosting platform may support multiple forms of Internet connectivity, in various embodiments. As illustrated in FIG. 1, and described above, this support may include program instructions, switches, and other mechanisms for supporting inbound- and/or outbound-initiated traffic. In some embodiments, configuration parameters may specify that a process be directly bound to an Internet-routable address, giving the customer full freedom over the protocols used by his or her application. Alternatively, a static network address translation (or NAT) may be configured that will map between internal addresses and an Internet address, supporting various protocols that are compatible with NAT. In still other embodiments, a VPN connection may be configured between an off-grid process and an internal address, which may allow the off-grid process to act as a full participant on one or more internal VLANs.

To support inbound-only traffic, the virtual system may include a load balancer. For example, an application switch resource may automatically distribute incoming traffic across a specified set of servers without the customer or customer code having to manage the distribution. Load balancing may be configured for Layer-4 and/or Layer-7 support, in some embodiments. For example, TCP, SSL, and/or UDP protocols may be support for a Layer-4 load balancer; and HTTP and/or HTTPS may be supported for a Layer-7 load balancer. Configuration parameters for a Layer-4 load balancer may specify the mapping from an Internet address and port to a set of internal servers that are characterized by their Internet address and port. Additional configuration parameters for Layer-7 load balancing may facilitate the ability to further redirect traffic based on URI pattern matching. In some embodiments, outbound-initiated traffic only may be supported by configuration of a dynamic NAT rule.

DNS configuration in the platform may simply specify the mapping from a host name to a list of IP addresses, in some embodiments. In some embodiments, two forms of DNS service may be supported: an Internet-facing DNS service that allows the rest of the world to resolve host names to Internet-allocated IP addresses, and an internal DNS service that resolves host names to internal network addresses.

Figure 7:
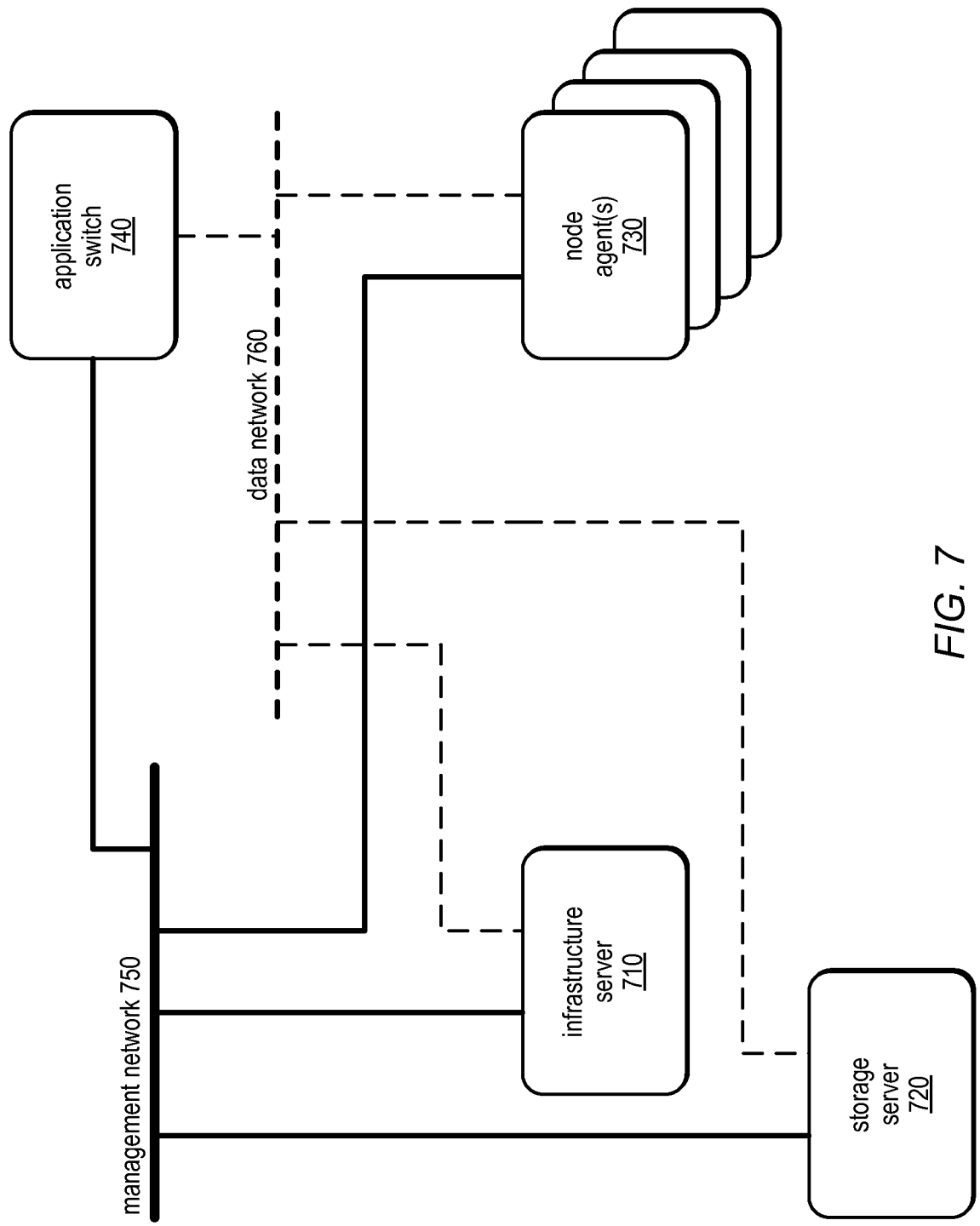
FIG. 7 illustrates a virtual system created and configured from a resource pool of a hosting platform, according to one embodiment.

An example of a virtual system created and configured from a resource pool of a hosting platform, as described herein, is illustrated in FIG. 7. In this example, there are multiple physical boxes (e.g., twenty 4-core Opteron™ boxes) that are used to run VMs in the system, illustrated as node agents 730. In this example, processes may be written in Java SE and may be configured in various zones, as described in more detail below. In this example, two other physical machines (e.g., two UltraSPARC T1 32-cool thread systems T2000) are used to run infrastructure and storage services, shown as infrastructure server 710 and storage server 720. An application switch 740 (e.g., a Sun secure application switch N2120V) is included in the system to provide network address translation and load balancing.

The example virtual system illustrated in FIG. 7 includes two physical networks. The first may be thought of as a management network 750 that infrastructure services use to talk to each other. The second may be thought of as a data network 760 that VMs and storage use to talk to each other and to the Internet. In this example, the data network 760 may be where all the VLAN work will come in. The infrastructure server 710 may include a resource manger, which may also be written in Java SE. The resource manager may server as a sort of central hub for all system resource allocation, and may control and delegate resources out to other agents as necessary. For example, a node agent 730 on each box where VMs run may be responsible for the lifecycle control of the VMs that are running on that box. The node agents 730 may operate under direction from the resource manager, in some embodiments. Similarly, the storage server 720 may include one or more file system agents and/or database agents, which may be responsible for lifecycle management of file systems and databases (e.g., PostgreSQL databases) in the virtual system. Note that storage server 720 may execute program code configured to manage one or more ZFS implementations and/or other file systems (e.g., files systems that operate according to the NFS protocol).

In some embodiments, a platform that hosts the development and deployment of customers' services, as described herein, may take advantage of operating system features to make some operations easier and/or more efficient. For example, in some embodiments, the platform may make use of Solaris Zones, a lightweight operating system-level virtualization mechanism introduced in Solaris 10, to facilitate some of the operations described herein. In such embodiments, every VM and every database instance may run in its own separate zone. In other words, in implementation terms, there is a one-to-one mapping between processes, databases, and zones. Zones may be used to provide security isolation between processes, as the basis for providing each process with independent file system mounts, and as the basis for providing each process and database with its own networking configuration.

Other operating system features, utilities, and/or services may be exploited in the platform, in various embodiments. For example, an IP Filter package included in OpenSolaris may be used for process level firewall control. In another OpenSolaris example, the use of IP Instances (which are separate views of the IP stack, limiting control and visibility to zones) may provide the appropriate routing configuration within each VM. Similarly, the Solaris Crossbow feature may provide the ability to support virtual Network Interface Card (NIC) configurations within each zone. In the example illustrated in FIG. 7, various Solaris resource management mechanisms may also be used to control scheduling and to implement any processor and/or memory constraints specified for a process configuration. Finally, in some embodiments, the Solaris extended accounting facility may be used to determine performance-related metrics of the system. For example, CPU and network usage information extracted using this facility may serve as the basis for commercial billing of the end users of a customer's hosted service.

The development and deployment platform described herein may be further illustrated by way of examples that include system calls from on-grid and/or off-grid processes. Two such examples, one involving starting a process, and the other involving creating a load balancer, are illustrated in FIGS. 8A-8E and 9A-9B, respectively. These examples illustrate the operation of the platform infrastructure (i.e., those portions used to implement a customer's virtual system) when such system calls occur, according to various embodiments.

Figure 8A:
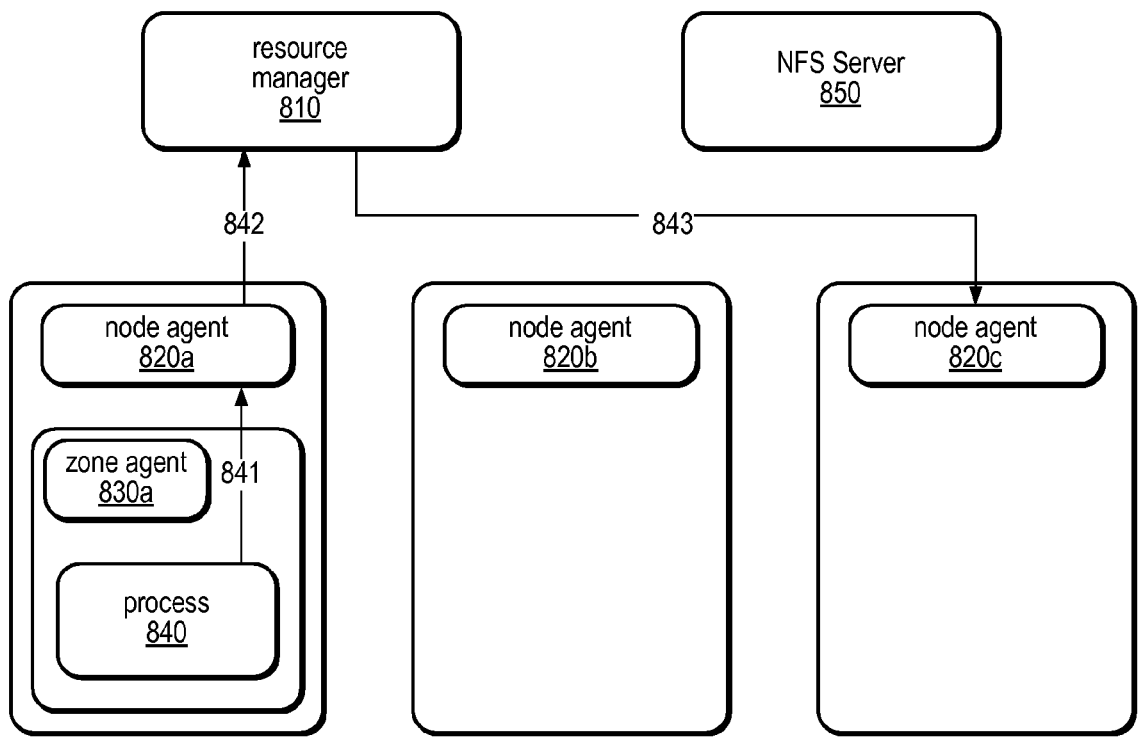
FIGS. 8A-8E are data flow diagrams illustrating various operations of a development deployment platform when starting a process, according to one embodiment.

In the first example, illustrated in FIGS. 8A-8E, a first process is already running on-grid (i.e., in the customer's virtual system), and that first process executes a system call to start up a second process. FIG. 8A illustrates a system call 841 from process 840 to a node agent 820a that is running on the same physical machine as manager process 840. As shown in FIG. 8A, node agent 820a forwards the system call over a private management network to resource manager 810, as a resource management request 842. For example, in some embodiments resource manager 810 may be a process executing on an infrastructure server, such infrastructure server 710 of FIG. 7. In this example, resource manager 810 decides which physical box the new process is going to run on, and forwards the request as node request 843 to the node agent 820c on that box, again, over the management network.

Figure 8B:
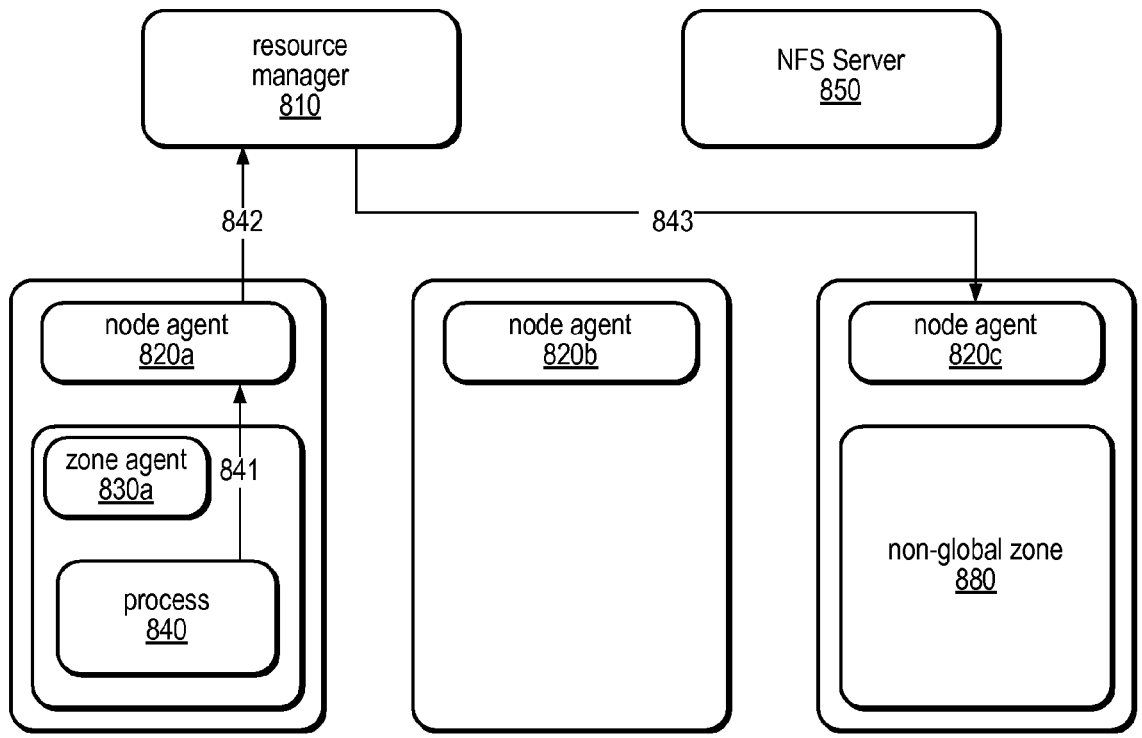
Figure 8C:
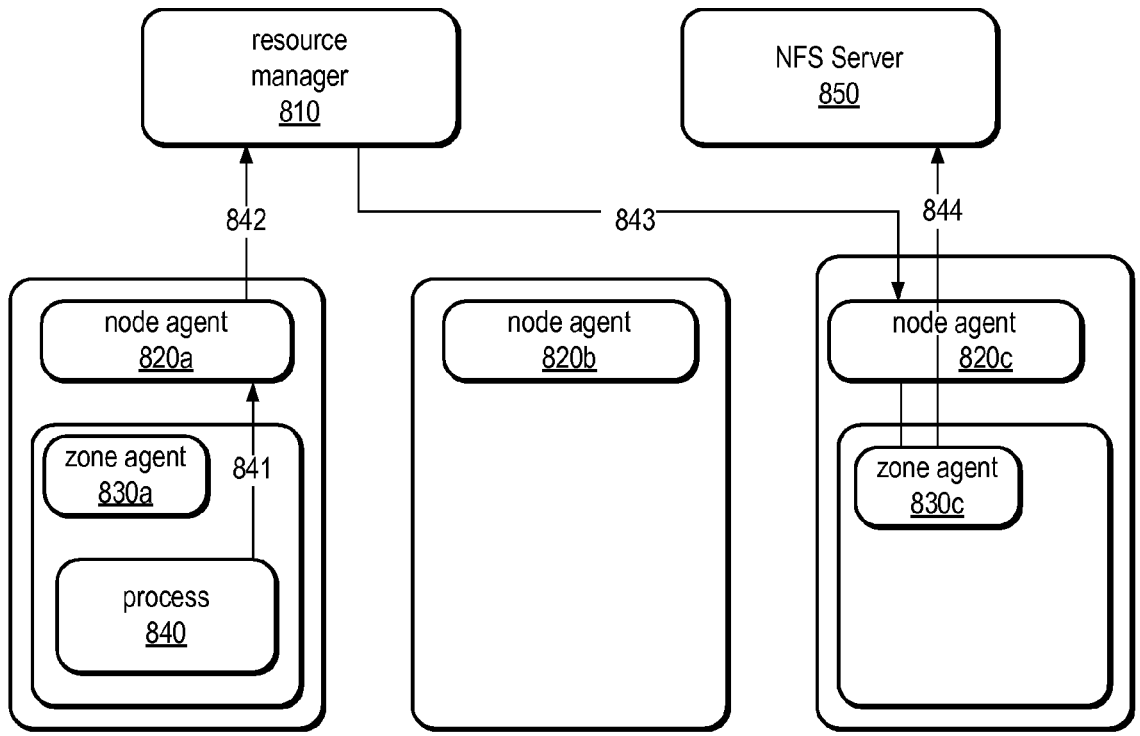
Figure 8D:
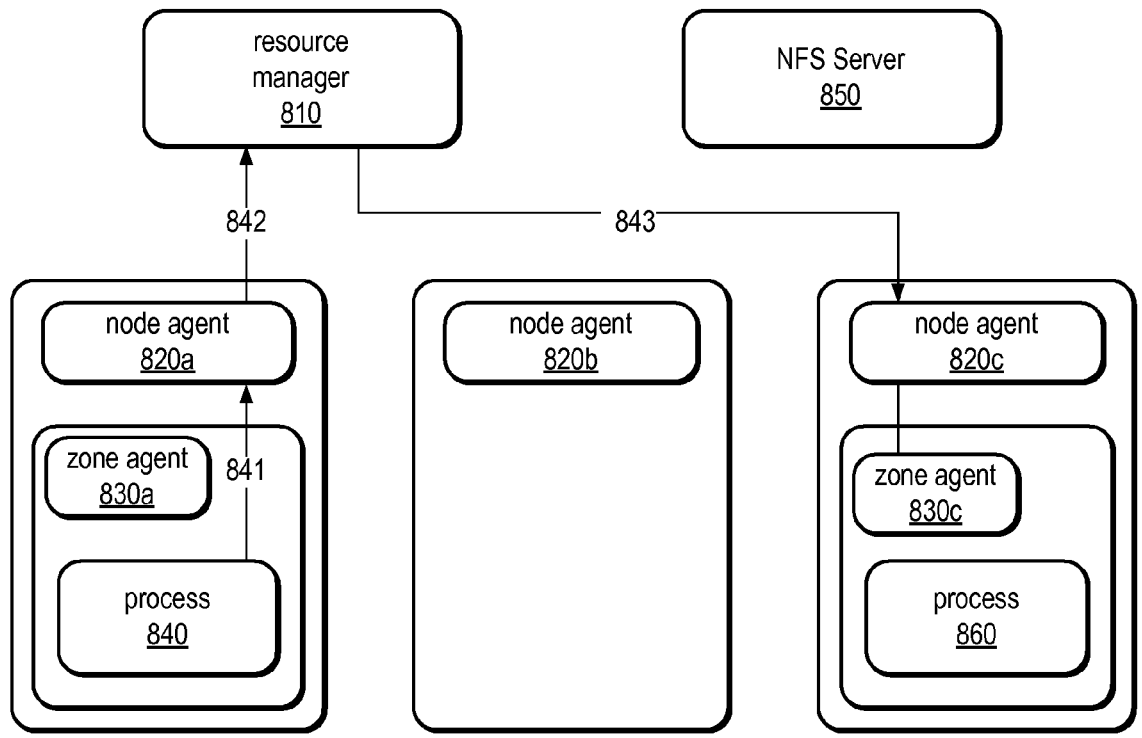
Figure 8E:
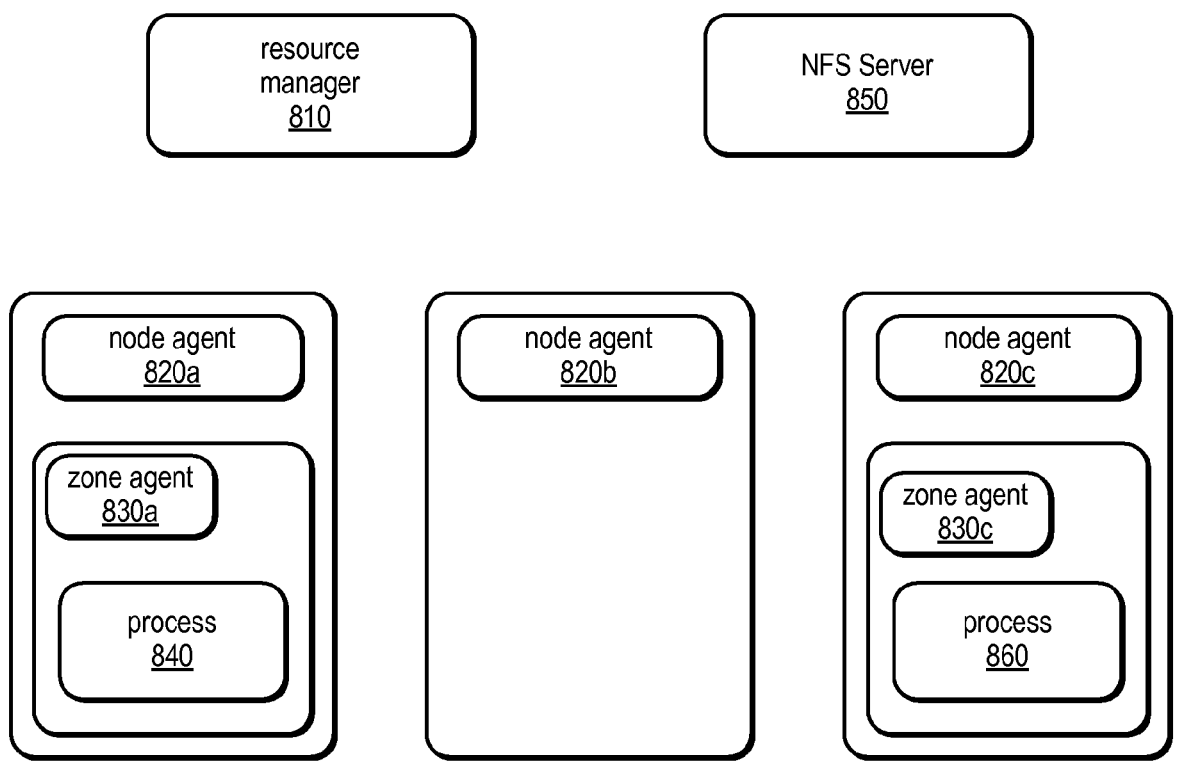

As illustrated in FIG. 8B, node agent 820c picks up a free zone from a free list (in this case, non-global zone 870), configures the zone for the networking setup that the process requires (as specified in its process configuration) and then boots that zone. Node agent 820c then spawns and runs a zone agent 830c inside that zone, as shown in FIG. 8C. In this example, zone agent 830c is responsible for performing any required NFS mounts, matching the file system mount configurations that were specified in the configuration for the new process. This is illustrated as 844 of FIG. 8C. Note that in this example, which assumes a Solaris operating system, file system mounting is done in the non-global zone 870, because in Solaris the file system mounting must be done inside the zone in order to be able for it to execute NFS mounts. FIG. 8D illustrates that once the file system mounts have been established, zone agent 830c spawns the target process 860 and starts it. FIG. 8E illustrates that once the new process 860 has been created, configured, and started, the system call is complete and the new process 860 is running under the identity of the customer, hosted by the platform.

Figure 9A:
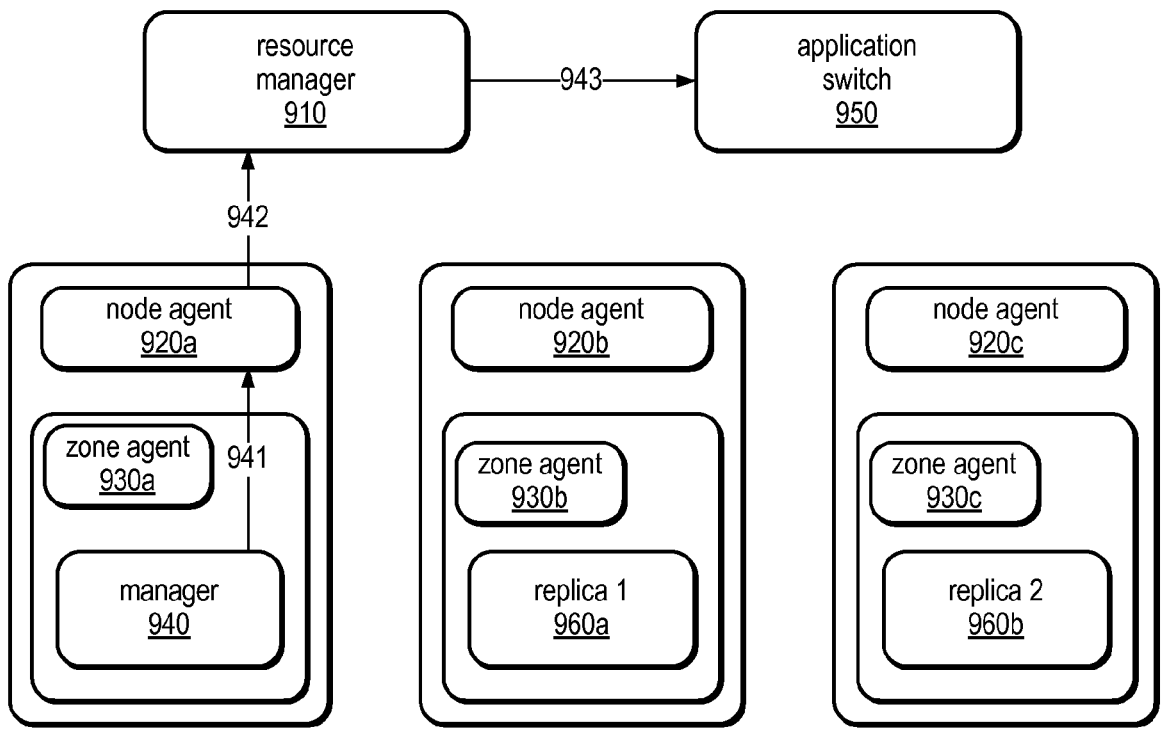
FIGS. 9A-9B are data flow diagrams illustrating various operations of a development deployment platform when creating a load balancer, according to one embodiment.
Figure 9B:
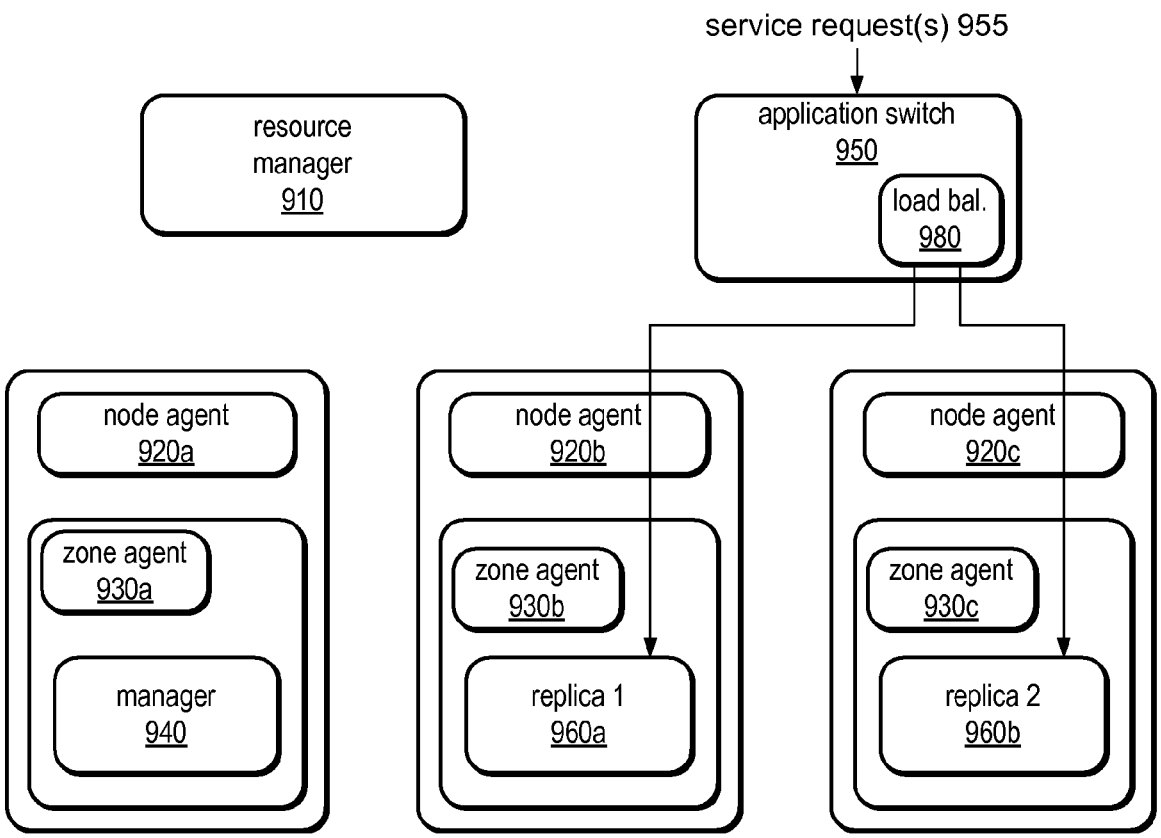

The second example, illustrated in FIGS. 9A-9B, illustrates the creation of a load balancer. In this example, the customer's virtual system includes a manager process 940 running on-grid, and two replicas 960 running on-grid. In this example, the manager process 940 makes a system call 941 to create a load balancer, as shown in FIG. 9A. In this example system call 941 goes to the node agent 920a running on the same machine, as in the previous example. Node agent 920a forwards the request on to a resource manager 910 just as before. This is shown as 942 in FIG. 9A. In this example, resource manager 910 establishes a Telnet connection to application switch 950 and uses a command line interface to set up a load-balancing rule, relieving the customer and/or customer code from having to do this itself. This is shown as 943 in FIG. 9A. As shown in FIG. 9B, once the load-balancing rule is set up, the application switch 950 is configured to provide a load balancing resource 980 in the customer's virtual system. At this point, traffic (e.g., service requests 955) can flow to the replicas 960a and 960b, with various requests distributed to each of them by load balancer 980.

Another example that may be used to further illustrate the hosting platform described herein involves a hybrid customer application (i.e., one that includes both an on-grid and an off-grid portion). In this example, the customer application includes a manager process that is going to run on the grid. In this example, the customer application is responsible for setting up multiple servlet containers in a load-balanced configuration, and to dynamically flex the number of replicas up and down based on demand. In this example, another application running off-grid is responsible for automatically setting up the manager process. In other words, this hybrid application will start executing off-grid, and essentially incrementally unroll itself onto the grid, with the manager process unrolling the individual servlet containers.

Figure 10:
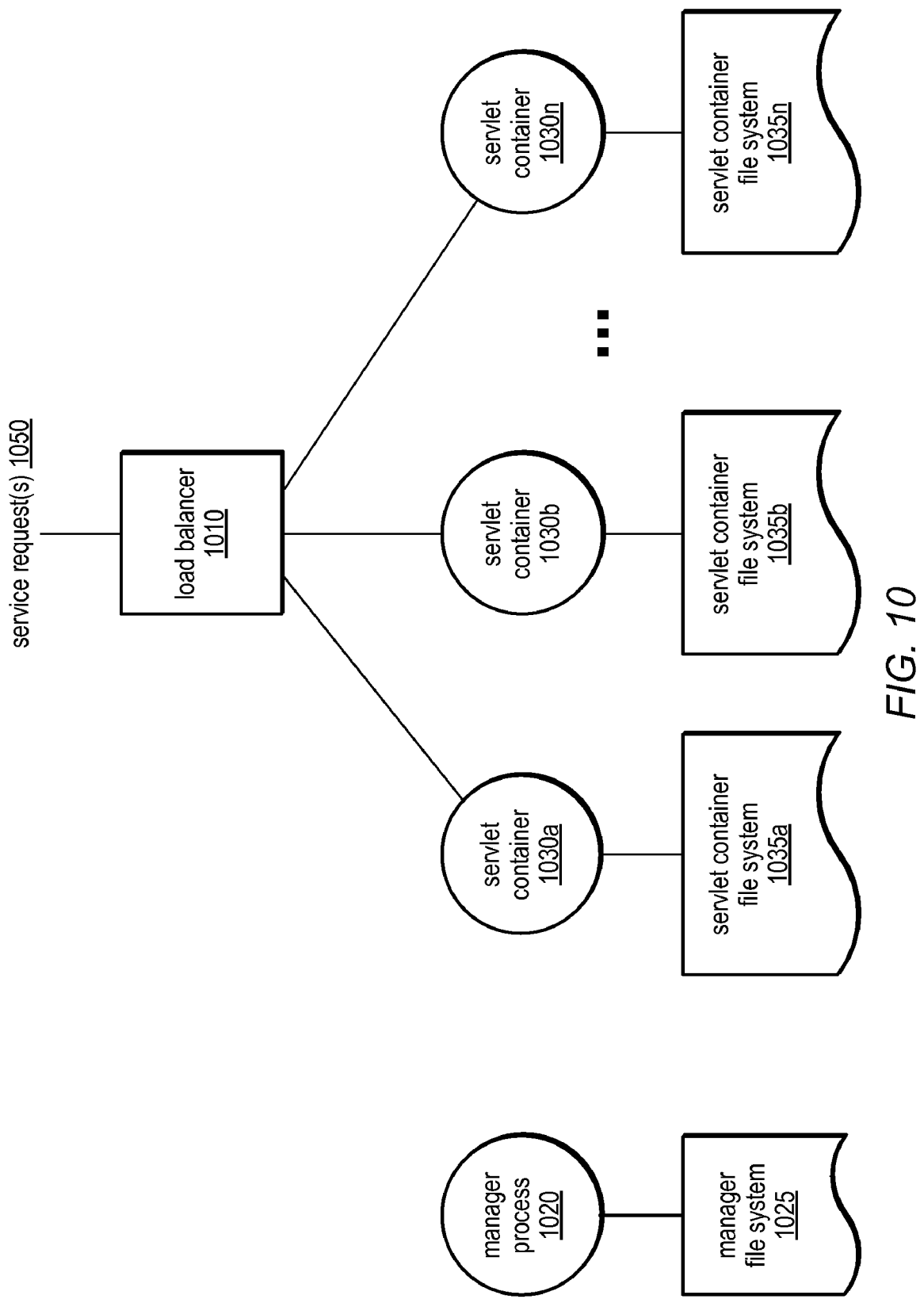
FIG. 10 is a block diagram illustrating a manager process and multiple servlet containers in a customer's virtual system, according to one embodiment.

The block diagram in FIG. 10 illustrates a manager process 1020 and servlet containers 1030a-1030n in a load-balanced configuration similar to the end state of the customer's virtual system, in this example. As illustrated in FIG. 10, in some embodiments, each process will have its own file system (e.g., there may be a servlet container file system 1035 for each servlet container 1030, and a manager file system 1025 for manager process 1020). This is in contrast to a typical operating system environment in which a single file system includes a plurality of top-level directories that are all unrelated to each other, or only semi-related to each other. For example, a ZFS implementation may allow the platform to, in effect, make each of those top-level directories their own file system, and to then take advantage of ZFS features for these file systems. In this example, each of the servlet container file systems 1035 may be a clone of a master file system with some slight differences for their configuration. In some embodiments, the file systems may be largely shared file systems with respect to each other.

In this example, the initial setup code for the off-grid application is configured to do three things. It will create a file system on the grid for the manager process to use, populate that file system, and then allocate a VLAN on the network for the on-grid services to use. The example code shown below includes operations that, when executed, may perform this setup, according to one embodiment.

```
Grid grid = GridFactory.getGrid(gridURL, userid, passwd);
FileSystem mgrFS = grid.createFileSystem("manager");
WebdavResource wdr =
    new WebdavResource(new HttpURL(webdavURL + "/manager/"));
wdr.setUserInfo(userid, passwd);
wdr.putMethod("manager.jar", new File("manager.jar"));
wdr.putMethod("container.zip", new File("container.zip"));
wdr.putMethod("servlets.zip", new File("servlets.zip"));
Network myNet = grid.createNetwork("myNet", 16);
```

In the example code above, a "getGrid" operation is called to obtain a reference to the grid. Next the code makes a system call, "createFileSystem" to create a file system and to name that file system "manager". The code above includes calls to several Jakarta Slide WebDAV APIs (e.g., "setUserInfo", and "putMethod") to configure and populate this file system. These calls, when executed, are used to store the manager code, the servlet container code, and the servlet code into the created file system. In the example code above, a system call ("createNetwork") is included to create a VLAN on the grid, to name that network "myNet", and to request at least 16 IP addresses for the network.

In this example, more program code may be configured to complete the setup of the off-grid application, including code to create a configuration for the on-grid manager process, to use that configuration to create a resource, and then to start the manager up. The example code below includes operations that, when executed, may perform these tasks, according to one embodiment.

```
ProcessConfiguration cfg = new ProcessConfiguration( );
cfg.setRuntimeEnvironment(RuntimeEnvironment.JAVA);
cfg.setCommandLine(new String[ ]{"-jar", "manager.jar"});
cfg.setFileSystems(Collections.singleton(
    new MountParameters(mgrFS, "manager")));
cfg.setWorkingDirectory("/files/manager");
NetworkAddress mgrIP = myNet.allocateAddress("manager");
cfg.setNetworkAddresses(Collections.singleton(mgrIP));
cfg.setProcessExitAction(ProcessExitAction.RESTART);
cfg.setSystemSinks("stdout.txt", false, "stderr.txt", false);
```

```
                         -continued
    ProcessRegistration mgrPR =
        grid.createProcessRegistration("manager", cfg);
    mgrPR.start( );
```

In the example code shown above, an empty process configuration is created using the "ProcessConfiguration" call. Next, the system is set up to run a JVM, using an operation "setRuntimeEnvironment". The code also includes a command line to use for that JVM. The code includes an operation to mount the manager file system that was created earlier on the grid as "/files/manager" and the working directory is set to be the root directory of that file system. The code then includes a system call "allocateAddress" to allocate a first IP address out of the VLAN, and to call that IP address "manager". Note that in this example, each resource type has an independent name space, so there is no conflict with the process that is also called "manager".

The next few lines of the code set configuration parameters for the virtual system. One is used to set up to bind the VM to the IP address, so that the IP address will be the IP address of the VM. Other configuration operations are usable to set the exit action so that the system will automatically restart the manager process every time it crashes, and to set up standard inputs and outputs. The code then includes a system call that is executable to use this configuration to create a process registration resource for the manager process. Finally, the code includes a system call executable to start the process up. In this example, the code shown above may include all the operations that the off-grid application has to do to set up and get the manager process running on-grid.

At this point in the example, the manager process is running. The manager process code includes initial setup code that, when executed will do three things. It will create a golden image file system that will be used as the basis for the servlet container file systems, it will populate that file system, and then it will set up all the initial servlet containers. The following example code includes instructions that, when executed, may perform these operations, according to one embodiment.

```
    // instance variables
    Grid grid = GridFactory.getProcessContext( ).getGrid( );
    Network myNet = grid.getNetwork("myNet");
    FileSystemSnapshot goldSnap;
    FileSystem goldFS = grid.createFileSystem("golden");
    grid.mountFileSystem(new MountParameters(goldFS, "golden"));
    Util.unzip("container.zip", "/files/golden");
    Util.unzip("servlets.zip", "/files/golden");
    grid.unmountFileSystem("golden");
    goldSnap = goldFS.createSnapshot("goldsnap");
    for (int i = 1; i <= N; i++) {
        addReplica( );
    }
```

As in the off-grid application code, the example code above first includes an operation to get a reference to the grid. Next, the code includes an operation to look up (or "find") the internal connectivity resource (i.e., the VLAN) that the off-grid application created. In this example, the off-grid application named the VLAN myNet, so the manager process can look it up by name. The manager code may include system calls to create the golden image file system, to name it "golden", and to dynamically mount that file system into the currently running manager process. In this example, the manager code includes operations to unzip the servlet container code and the servlet code into the golden file system, and to unmount the file system. Another system call is executable to create a read-only snapshot of the golden file system, which will be used as the basis for cloning of file systems going forward. Finally, the manager code includes a loop through which the manager process creates as many initial servlet containers as are needed, using an "addReplica" method. The following example code includes more instance variables used in the example described above, and some of the details of the addReplica method, according to one embodiment.

```
    // more instance variables
    LinkedList<RealService> services = new LinkedList<RealService>( );
    LinkedList<FileSystem> clones = new LinkedList<FileSystem>( );
    LinkedList<ProcessRegistration> procRegs =
        new LinkedList<ProcessRegistration>( );
    void addReplica( ) {
        String replicaName = "replica-" + (services.size( ) + 1);
        NetworkAddress replicaIP = myNet.allocateAddress(replicaName);
        services.add(new RealService(replicaIP, 8080));
        FileSystem cloneFS = goldSnap.clone(replicaName);
        clones.add(cloneFS);
        grid.mountFileSystem(new MountParameters(cloneFS, "server"));
        editConfigurationFiles("/files/server", ...);
        grid.unmountFileSystem("server");
```

In the example code above, the first part of the method is executable to do three things: to allocate an IP address for a given servlet container, to create a clone of the golden file system, and to configure the file system for that servlet container. The first operation of the method generates a name for the replica. Next, the method includes a system call executable to allocate another IP address from the VLAN created earlier. This IP address is what the servlet container will bind to. In this example, every servlet container will be configured to listen internally on port 8080, as shown in the code above. The method illustrated above includes the use of linked lists to remember a list of address and port pairs for the replicas created using the method. In this example, that list will be used later when in configuring the load balancer.

The example method above includes a system call executable to make a copy-on-write clone of the golden image file system, as described herein, and another call to store an indication of that file system in one of the linked lists. The method also includes code executable to dynamically mount that file system into the running manager process, again, mounted as "/file/server". At this point edits may be made to applicable configuration files for that file system, in order to set it up for the given servlet container. Note that in this example, for every edit made, there is a copy-on-write operation performed, as described herein. Therefore, any edited configuration files become private to the given cloned file system, but the rest of the content of that file system may remain shared with the golden snapshot, and may remain shared across all the other clones that are created. Finally, the example above includes code executable to unmount the file system. Example code to perform the remaining operations of the addReplica method is shown below, according to one embodiment.

```
    ProcessConfiguration cfg = new ProcessConfiguration( );
    cfg.setRuntimeEnvironment(RuntimeEnvironment.JAVA);
    cfg.setCommandLine(new String[ ] {<<container command line>>});
```

```
    cfg.setFileSystems(Collections.singleton(
        new MountParameters(cloneFS, "server")));
    cfg.setWorkingDirectory("/files/server");
    cfg.setNetworkAddresses(Collections.singleton(replicaIP));
    cfg.setProcessExitAction(ProcessExitAction.RESTART);
    cfg.setSystemSinks("stdout.txt", false, "stderr.txt", false);
    ProcessRegistration replicaPR =
        grid.createProcessRegistration(replicaName, cfg);
    procRegs.add(replicaPR);
    replicaPR.start( );
}
```

The program code representing the second half of the method includes operations similar to operations included in the off-grid application of this example. This portion of the method includes code executable to create a configuration for the servlet container, create a resource for that container, and then start it up. First, an empty process configuration will be created. Again, a JVM may be used and may be set up via the command line. The method includes code executable to implement mounting the cloned file system as "/file/server", and setting the working directory to be the root of that file system. Other code shown in the example above is executable to bind the VM to the given replica's IP address, to set up the exit action for the process so that the system will again automatically restart the servlet container any time it crashes, and to set up standard inputs and outputs. Again, other system calls are executable to create the process registration resource using that configuration, to store an indication of the process away, and to start the servlet container up and running. At this point the servlet container is up and running. Since the manager process calls the addReplica method in a loop, execution of the manager process results in the virtual system including a plurality of servlet containers that are up and running.

In this example, all that is left to do is to connect the servlet containers out to the Internet, making them accessible through a load balancer. In this example, a Layer-4 load balancer will be set up to manage distribution of work between the replicas that were created. The example code below includes instructions that, when executed, may create and configure the load balancer, according to one embodiment. As shown below, the code includes an operation to create an empty configuration, and a system call to allocate an Internet address for the service, naming the resource "external." The load balancer will then be configured to use the TCP protocol on port 80 on the external Internet address through a series of configuration operations. Therefore, any traffic coming in over TCP port 80 will be load balanced across the set of services.

```
    // more instance variables
    L4VirtualServiceConfiguration lbCfg;
    NetworkSetting myLB;
    lbCfg = new L4VirtualServiceConfiguration( );
    NetworkAddress extIP =
        grid.allocateInternetAddress("external");
    lbCfg.setExternalAddress(extIP);
    lbCfg.setPort(80);
    lbCfg.setProtocol(Protocol.TCP);
    lbCfg.setRealServices(services);
    myLB = grid.createNetworkSetting("myService", lbCfg);
    grid.bindHostName(myHostName,
        Collections.singletonList(extIP));
```

In the example code above, the operation "setRealServices", when executed, defines the set of services, i.e., all the address and port pairs of each of the servlet containers. The code then includes a system call to create the load balancer, to name the load balancer "myService" and to use the configuration that was set up for it. As soon as that system call completes its execution, the load balancer will have been created and traffic may be allowed to flow through it. However, at this point, there is not an easy way for end users to find the services. Therefore, the last operation shown in the code above is a system call to bind the hostname to the external Internet address so that end users can make use of the services. At this point, service request traffic may be flowing, end users may make use of the service, and the service is starting to get some load.

As previously noted, the platform may in some embodiments provide support for a service to flex its own resources up or down to match demand. For example, code within the customer's application, or a platform-provided monitoring utility included as a resource in the customer's virtual system, may monitor the workload directed to the service and may determine that one or more additional replicas are needed to efficiently handle the load. To add another servlet container in the system, in response to this determination, the customer code may call the same addReplica method that was used to set up the original replicas, as in the example code below.

```
    addReplica( );
    lbCfg.setRealServices(services);
    myLB.changeConfiguration(lbCfg);
```

A call to the addReplica method, in this example, may create and start up a new servlet container. As shown above, the customer code may modify the local load balancer configuration, add that service into the mix, and then make a system call to reconfigure the load balancer with that new set of services. In this example, as a result of that reconfiguration, the new servlet container will be added into the load balancing pool.

Alternatively, a monitoring method or utility may determine that, at a given point in time, the workload is light enough that not all resources in the customer's virtual system are needed. For example, the monitoring method may track how many and/or which resources are actually in use, and may detect that the current resources are being underutilized. To flex the resources of the customer's down, a servlet container is selected to be removed from the pool, the local load balancer configuration is modified to remove that service, and a system call is made to reconfigure the load balancer with the smaller set of services. These operations, illustrated by the example code below, will remove the targeted servlet container, and thus, a process resource, from the load balancing pool. At that point, that VM may be shut down and its resource may be destroyed (e.g., according to its exit action configuration parameter). Once the resource is destroyed, the target servlet container's IP address may be freed and its file system may also be destroyed, completing clean up of the flex down process.

```
    RealService svc = services.removeLast( );
    lbCfg.setRealServices(services);
    myLB.changeConfiguration(lbCfg);
    ProcessRegistration replicaPR = procRegs.removeLast( );
    replicaPR.destroy( );
    svc.getNetworkAddress( ).delete( );
    FileSystem cloneFS = clones.removeLast( );
    cloneFS.destroy( );
```

The example hybrid application described above includes calls to many of the methods that may be provided and/or supported by a development and deployment platform, according to various embodiments. These and other methods that may be provided and/or supported by such a platform are described in more detail below, in the context of an embodiment built using Java™ and providing a grid interface API, as described herein.

As previously noted, instances of the grid interface may serve as proxy objects that can be used to allocate resources and discover what resources have been created. The GridFactory class can be used to create a Grid proxy that will talk to a specified grid on behalf of a specified customer.

In this example, each ProcessRegistration instance may represent a customer program that should be run on-grid using one of the supported runtime environments. Note that in this example, an instance variable, RuntimeEnvironment, enumerates the currently supported runtime environments. As described herein, a process registration resource can be used to start the program running, in which case it may be said there is a process associated with the registration, and that the registration is running. At any given time there may be at most one process associated with a given registration. However, a given registration may start its associated program multiple times, resulting in a sequence of non-overlapping processes. While a process may always associated with a registration, and may never out live its associated registration, the lifetime, life cycle, and identity of a registration may be independent of any process. As previously noted, on-grid process registrations may specify what file systems should be mounted and made accessible to any associated process. In some embodiments, all process registrations must specify at least one file system to be mounted. Generally, the customer program (e.g. Java™ byte codes, Perl™ script, etc.) to be executed will be read from one of the mounted file systems. Programs (e.g., the customer program and/or platform-provided utilities) may also read data from the mounted file systems, and, if the file systems are not read-only file system (or mounted as read-only file systems) they may write to them as well. Therefore, a new customer may need to create at least one new file system before creating any process registrations, and may need to populate the file system with software before starting any registrations. In some embodiments, the destruction of a process registration may have no effect on any of the file systems that were associated with it.

As noted above, processes may in some embodiments discover various things about the registration they are associated with via their process context object. In this example, an on-grid process may obtain its process context object by invoking GridFactory.getProcessContext. Similarly, an on-grid process may obtain a reference to the grid on which it is running using the getGrid method. In this example, off-grid processes may obtain a reference to the grid by calling a static GridFactory.getGrid method, or by using the GridFinder utility. In this example, process registrations may be created using a Grid.createProcessRegistration method. Similarly, Grid.getProcessRegistration, Grid.getResource, and Grid.findProcessRegistrations methods may be used to obtain references to existing registrations.

In this example, a Network resource may in some embodiments represent a customer-private broadcast domain providing network isolation for an application, and the Grid interface may serve as the factory for network resources. A Network resource may be used to allocate NetworkAddress resources that can be bound to customer processes via ProcessRegistration instances. When allocated via a Network resource proxy, a NetworkAddress may represent a single, non-routable internal address available for use by the application. Processes bound to internal addresses allocated from the same Network resource may enjoy IP network connectivity.

A NetworkAddress resource may be referenced by a number of other resources in the system. For example, process registrations, network settings and database instances may typically be bound to one or more customer-owned NetworkAddress resources via the address' UUIDs, in some embodiments. As previously noted, the system may not allow a NetworkAddress resource to be deleted while other resources (e.g., process registration resources, network setting resources, database resources, or host name binding resources), are explicitly referencing the address resource. Similarly, in some embodiments a Network resource may not be deleted from the system until all the NetworkAddress resources allocated from it have been explicitly deleted using an API call, e.g., a call to a NetworkAddress.delete method.

As previously noted, the platform API may also support access to a single, shared external network, in some embodiments. This network may provide connectivity between on-grid processes and off-grid hosts. The Grid interface may in some embodiments provide the methods for the allocation of routable addresses from the external network. An external address may be represented by a NetworkAddress resource. External addresses can be bound to one or more NetworkSettings via an appropriate NetworkConfiguration to provide a mapping between an external IP address and one or more internal addresses, in this example.

In this example, Network resources may be created using a Grid.createNetwork method. In this example, Grid.getNetwork, Grid.getResource, and Grid.findAllNetworks methods may be used to get references to existing networks. Non-routable NetworkAddress resources may be created using a Network.allocateAddress method. In this example, Network.getAddress and Network.findAllAddresses methods may be used to get references to existing internal network addresses. External NetworkAddress resources may be created using a Grid.allocateExternalAddress method, in this example, and Grid.getExternalAddress and Grid.findAllExternalAddresses methods may be used to get references to existing external network addresses.

New file systems may in one embodiment be created using a Grid.createBaseFileSystem method. In other embodiments, file systems may be created using various tools such as a NetBeans plugin, a Grid Accessor GUI (described later), or supported Apache Ant tasks. In this example, Grid.getFileSystem, Grid.getResource, and Grid.findAllFileSystems methods may be used to obtain references to existing file systems.

PostgreSQL databases may be dynamically created, destroyed, and may have a life cycle that is independent of any process registration, in some embodiments. Proxies for database resources, in this example, may implement a PostgreSQLDatabase interface. Note that while ProcessRegistration resources may include references to file systems and the referenced file systems may be automatically mounted when a process is created from the registration, ProcessRegistration resources may not include references to databases, in some embodiments. As a result, customer processes may need to explicitly connect to databases, in such embodiments. A PostgreSQLDatabase may include a number of methods for obtaining the information necessary for establishing a connection, in some embodiments. In this example, new databases may be created using a Grid.createPostgreSQLDatabase method, and Grid.getPostgreSQLDatabase, Grid.getResource, and Grid.findAllPostgreSQLDatabases methods may be used to obtain references to existing databases.

A NetworkSetting (interface) resource may in some embodiments be used to establish a mapping between an external IP address and one or more internal IP addresses. The nature and details of a particular mapping may be controlled by a NetworkConfiguration resource associated with the setting. For example, one of the following configuration resources may be applied to establish such mappings, in one embodiment.

DynamicNatConfiguration instances may be used to establish an outbound mapping and may allow multiple internal addresses to be associated with the same external address.

StaticNatConfiguration instances may be used to establish a 1:1, bidirectional mapping between an internal and external IP address.

L4VirtualServiceConfiguration instances may be used to establish an inbound mapping from a particular external address/port pair to zero or more internal address/port pairs. Incoming traffic may be load balanced across all the internal address/port pairs. A given mapping may forward either UDP or TCP traffic.

HttpVirtualServiceConfiguration instances may be used to establish an inbound mapping from a particular external address/port pair to zero or more internal address/port pairs. The incoming connection may be a HTTP connection and may be load balanced across different sets of services based on URI pattern matching. HttpVirtualServiceConfiguration also supports HTTP cookies.

Note that, in this example, new network settings may be created using a Grid.createNetworkSetting method. In this example, Grid.getNetworkSetting, Grid.getResource, and Grid.findAllNetworkSettingsSystems methods may be used to obtain references to existing network settings.

The platform may allow host names to be associated with grid internal and external IP addresses or other host names, in some embodiments. As described herein, a HostNameBinding may represent a mapping between a host name and one or more IP addresses, or a mapping from a host name to another host name. In this example HostNameBindings may constitute the information that can be queried through the host name resolution facilities such as the InetAddress class of the platform. In this example, every HostNameBinding may belong to a HostNameZone, and every customer may own two HostNameZones: an internal zone and an external zone. Host names in the internal zone may only be "visible" to the customer's processes running on the grid. In this example, the domain name of the internal zone may be <custid>.PlatformName.local., where <custid> is a customer identifier. Host names in the external zone may be "visible" to everybody outside of the grid as well as to all processes running on the grid. In this example, the domain name of the external host name zone may be a property of the customer's account. In some embodiments, it may be specified the account is created, and may be changed later by grid administrator in response to a customer request. In this example, there may be no system calls in the public API that would allow changing this property directly. In such embodiments, the customer may need to make sure there are no HostNameBindings in the external zone prior to requesting a domain name change for the external zone, otherwise the change will fail. By default, in this example, the domain name of the external zone may be <custid>.<griddomain>, where <custid> is the customer identifier and <griddomain> is the domain name of the grid.

In this example, a reference to the internal host name zone may be obtained using the Grid.getInternalHostNameZone method, and a reference to the external host name zone may be obtained using the Grid.getExternalHostNameZone method. HostNameBindings may be created using the HostNameZone.createBinding method, and HostNameZone.getBinding, Grid.getResource, and HostNameZone.findAllBindings methods may be used to obtain references to existing bindings.

As previously described, running processes may be killed gently or forcefully using different methods, in some embodiments. In this example, a shutdownGently and a shutdownForcefully method may be used to kill a running process. These methods may in one embodiment take a Boolean argument named currentOnly, whose purpose is to handle certain failure/retry scenarios. In some embodiments, passing "false" for currentOnly may be the default, or initial case.

As noted herein, a development and deployment platform may provide a package of utilities for use by customer code. For example, such a package may provide a repository for common operations and functionality related to use of the platform. Note that methods similar to some of those described below are included in example code herein. In various embodiments, programs may invoke most or all APIs included within such a package whether they are running on- or off-grid. For example, in one embodiment, the utilities described below may be provided as a package by the platform. In other embodiments, similar functionality may be provided in one or more other utilities or utility packages (e.g., similar methods written in other programming languages and/or methods tailored to specifics of the platform architecture), and/or a package may include other operations and functionality related to the use of the particular platform.

In this example, a GridFinder utility may provide the developer with a programmatic means for acquiring the user information necessary to establish a connection to an instance of the platform Grid. In this example, GridFinder may support the use of file-based, command line and/or GUI interactions with the customer to retrieve the necessary URL, username and password. Upon successful execution, GridFinder may provide the caller with a grid reference generated from the customer-supplied specification.

In this example, a Grid Accessor utility may be a stand-alone GUI utility based on the platform's NetBeans plugin. In this example, all or most of the features provided by the plugin may also be supported by Grid Accessor. For example, in one embodiment, Grid Accessor may not support access to a visual debugger. Grid Accessor may in some embodiments be invoked by entering a command modeled after the following:

java-jar gridaccessorjar [dir]

where dir is a directory that already exists, and that will be used for storing any persistent data generated by the tool.

In this example, a NetBeans plugin may be provided for platform grid access that supports:

viewing all registered grid resources owned by the user direct creation, editing, and destruction of grid resources access to grid file systems through a WebDAV client with support for file upload/download operations through familiar drag-and-drop gestures declaratively configuring off-grid launchers graphical debugging of processes running on the grid automatic installation of the PlatformName.jar grid library In this example, the NetBeans plugin may be accessed through a Grid Access dialog box for a particular project. After logging into the grid through this interface, the customer may can create, monitor, modify and/or destroy on-grid resources, and may also run or debug a process through this dialog box. If an off-grid launcher is configured through the Grid Access dialog, the configuration data may be stored in the project.

In this example, the platform may provide functionality through a set of Apache Ant tasks that may be used to manipulate platform resources. For example, such tasks may be used to create Ant scripts that automate deploying services to platform, in some embodiments. In this example, the tasks may represent create, retrieve, update, and delete operations performed on a platform resource. In this example, the Ant tasks may share the following common attributes:

name—name of the resource to manipulate (required).
  op—operation to perform on the resource; must be one of "create", "retrieve", "update", "delete" (not required). The default operation may be retrieve.
  gridref—reference to GridAdapter (required, unless a GridAdapter is provided as a nested element or as an element with the PlatformName.grid identifier).

In addition to these common attributes, Ant tasks may include additional attributes and/or parameters. In some embodiments, and for some tasks, parameters of these tasks may be specified as nested elements or as well-known project-wide elements instead of through the gridref attribute. In some embodiments, and for some other tasks, parameters may be required to be specified as nested elements.

A create ant task may be primarily used to create platform resources. In this example, as a convenience, if a resource already exists, it will simply be retrieved. This may relieve a developer from having to use conditional code to determine if a resource already exists prior to creating it. In such embodiments, conditional code may still be used as a performance consideration to skip a target containing a create operation, but may not be required. The semantics of the create task, in this example, are as follows: the Ant task representing the create operation attempts to create a new resource with the name specified in the name attribute. If a resource with the given name already exists, the task attempts to retrieve that resource. Failure to create or retrieve a resource with the given name results in an exception (in this case, an org.apache.tools.ant.BuildException) being thrown by the task. If a resource supports updates, and if the properties of the on-grid resource do not match the properties used by the create operation, then the on-grid resource properties will be changed to match those used by the create operation.

For a retrieve operation, in this example, the Ant task representing the operation attempts to retrieve the resource with the name specified in the task's name attribute. If the task cannot retrieve the resource, and exception (in this case, an org.apache.tools.ant.BuildException) is thrown. Retrieve may be largely used to obtain handles to relatively long-lived resources that may have been created and configured outside of the Ant project that is being executed. Retrieve may in some embodiments be the default operation on resources.

An update operation may be used to update a resource's configuration if the resource supports updating. In this example, ant tasks representing the update operation attempt to retrieve the resource specified in the task's name attribute and update its configuration. If the resource cannot be retrieved or the resource's configuration cannot be updated an exception (again, an org.apache.tools.ant.BuildException, in this case) is produced. Resources that do not support update operations may also produce an exception (e.g., a java.lang.UnsupportedOperation exception).

A delete may be used to destroy the resource named in the name attribute of the task if the resource exists. In this example, if the resource exists and cannot be deleted or if the task cannot determine if the resource exists an exception (again, an org.apache.tools.ant.BuildException) is thrown. If the task determines that the resource does not exist, as a convenience to the developer, no exception is raised, in this example. Otherwise, use of delete may require conditionals. Once again, conditionals may still be useful as a performance consideration but may not be required.

In addition to the operations listed above, the tasks provided may be used in Ant conditional expressions and may produce a value of "true" if the named resource exists; otherwise, "false" will be produced. For example, the following code may be used to set the filesystem_exists property to true if the file system specified exists. In this example, if the file system does not exist, the property may be set to false.

Check for the existence of resources

```
<condition property="filesystem_exists" else="false">
   checks if filesystem exists
   <PlatformName:filesystem name="${filesystem}"/>
</condition>
```

As previously described, a development and deployment platform may provide a web server that automates setup and management of a horizontally scaled web tier as a macro-component (resource) available in the customer's virtual system. For example, in one embodiment, such a web server may provide a dedicated farm of grid-aware servlet containers. Note that current web service solutions typically treat horizontal scale largely as an afterthought. By contrast, a web server provided by the platform described herein may be constructed from industry standard off-the-shelf components, but may be primarily focused on facilitating the web service tier through employing horizontal rather than vertical scaling tactics. By melding these existing pieces into the platform environment, such a web server may provide an interesting stage upon which to perform some new (and/or previously difficult to achieve) tasks with relative ease.

A web server provided by a platform may in one embodiment support the following basic command set:

install—this command may be used to install the on-grid portion of the software package
  uninstall—this command may be used to remove the on-grid portion of the software package and all web server-allocated resources
  isinstalled—this command may be used to determine if a particular version of the web server is installed
  create—this command may be used to initialize the necessary environment and resources for controlling a web server farm
  destroy—this command may be used to destroy any allocated resources on grid, including file systems
  teardown—this command may be used to destroy all allocated resources on grid, excluding file systems
  start—this command may be used to start the web server instances
  stop—this command may be used to halt any running web server instances, but may allow an agent server (described later) to continues to run
  deploy—this command may be used to deploy a Web ARchive (WAR) file to the grid
  flex—this command may be used to manually flex the count of servers on grid and/or to enable auto-flexing by a customer's application info—this command may be used to retrieve basic status information about the currently running group of web servers Note that in some embodiments, a flex command, such as that listed above, may be invoked anytime after an agent server has begun operation. By default, the number of server instances to run may either be 1 or a value optionally specified by a "-min" argument in the corresponding create operation. For example, in one embodiment, if a web server process is started prior to executing the flex command, the process may only run a single web server instance. If the customer wishes to define a farm with a minimum of three servers running at all times and a maximum of seven servers at any time, the customer and/or customer code may employ the -min and -max arguments to specify these limits. If an attempt is made to flex the resources of the farm manually, any attempt flex outside this range will fail, in this example. Its important to note the flex command, like most of the command line interface commands, may be asynchronous in nature, that is, the flex command may not wait for the agent server to start two more servers before returning control to the user. In this example, if the customer is happy with the default minimum, but prefers to start with more servers than that initially, in this case 3, the following -flex command may be executed:

java -jar $install_dir/PlatformNamewebserver.jar -name serverfarm -flex 3

As previously noted, the platform may in some embodiments be configured to allow a process to auto-flex its resources. In the web server example above, the platform may allow auto-flexing of the number of web servers in response to a detected change in the incoming load. In this example, auto-flexing may be enabled by executing the following command:

java -jar $install_dir/PlatformNameserverjar -name serverfarm -flex auto

In this example, to disable auto-flexing after it has been enabled, the flex command may be executed as in the first example, including an argument specifying the number of servers to which the resourced should be flexed. The web server process may then flex the system to that number and disable any further dynamic operations. Note that, in this example, if the farm is flexed dynamically in response to a change in load, the auto-flexer may not flex the server count outside any min/max range specified at creation. Note that while the flex command and auto-flexing capabilities have been described above in terms of a web server and server farm, in other embodiments, the same (or similar) commands may be used to flex resource types other than process resources (e.g., storage resources, network resources, etc.) manually and/or automatically.

Note that in other embodiments, more, fewer, similar, or different commands than those listed above may be provided by a web server, or other macro-component of a platform, to ease code development by SaaS providers and other developers.

In an embodiment that includes a web server macro-component, one method for using the web server may include any or all of the following steps:

download and/or unpack the web server software into a suitable location (e.g., a local directory)

create required grid resources (e.g., a network and an external address resource may be required), using any of the operations described herein for creating resources optionally create an external DNS host name binding so that servers (e.g., this server farm instance) may later be referenced by name install the on-grid portion of the web server software (e.g., using an install command of the command line interface)

start an on-grid web server monitoring process, termed the "agent server", which oversees the life cycles of the individual web servers, and receives and processes commands from the off-grid command line interface. In some embodiments, the agent server is started using a create command and performs a series of initialization steps and sets up a communication channel upon which it may receive further instructions. Required parameters of the create command may include: the grid resource name of the external IP address to be served, the grid resource name of the network to deploy onto, and the unique user given name of this farm instance. Optional parameters may include a minimum number of web server instances to deploy (e.g., at least 1, with a default of 1), a maximum number of web server instances that can be deployed (e.g., no more than 32, with a default of 16), a debugging option, and an option to turn off the automatic creation of dynamic NAT for each web server.

optionally enable manual and/or automatic flexing of resources (e.g., within the minimum/maximum limits specified in the create operation) using the flex command deploy an application using WebDAV, or using a deploy command of the command line interface (e.g., one having parameters that include the name of the server farm, and the directory in which the application can be found)

create the processes and network connections to make the deployment of the web server active, e.g., by executing a start command that includes the server farm name optionally execute one or more web server commands to obtain information about the software or system (e.g., commands that return a version identifier, installation status, or other information, given the server farm name)

Figure 11:
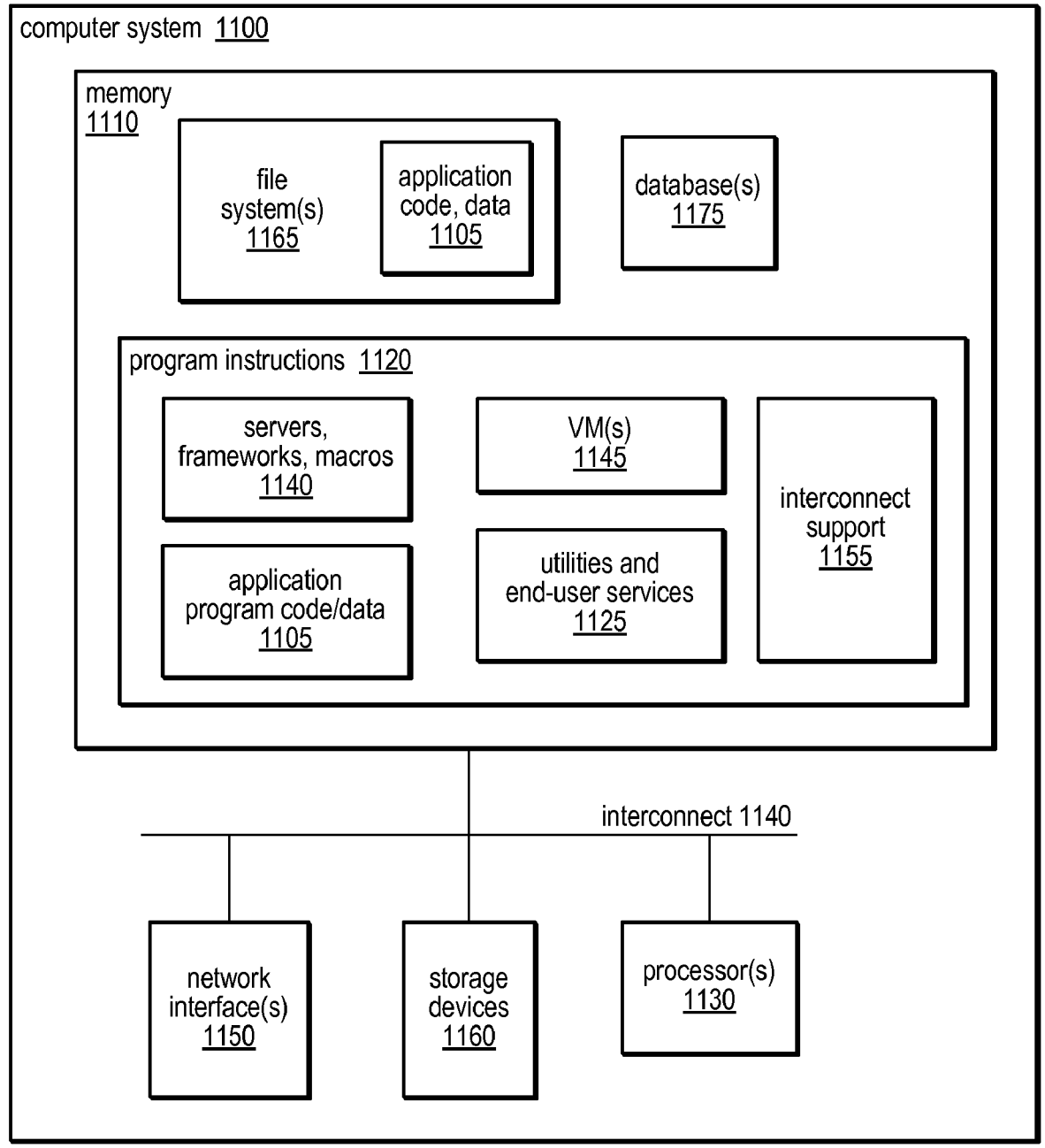
FIG. 11 is a block diagram illustrating an exemplary computer system suitable for implementing a development and deployment platform, according to one embodiment.

The system and methods described herein may be suitable for application to any of various computing systems. FIG. 11 illustrates a computing system capable of implementing one or more components of the development and deployment platform described herein and/or a computing system capable of communicating with such a platform (e.g., a client computing system configured to execute off-grid applications and/or to interact with on-grid resources through various interfaces), according to various embodiments. For example, development and deployment platform may include multiple computer systems 1100, each of which provides various computation resources, storage resources, and/or interconnect resources available for inclusion in an SaaS provider's virtual system (e.g., grid). Computer system 1100 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. Note that in some embodiments, each node of a development and deployment platform may comprise a computer system identical or similar to that illustrated in FIG. 11, while in other embodiments, two or more nodes of the platform may comprise computer systems having more, fewer, or different components than those illustrated in FIG. 11.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer) and executable by the machine to implement the methods described herein. The machine-readable medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1100 may include a processor unit 1130 (possibly including multiple processors, a single-threaded processor, a multi-threaded processor, a multi-core processor, etc.). The computer system 1100 may also include one or more system memories 1110 (e.g., one or more of cache, SRAM, DRAM, RDRAM, EDO RAM, DDR RAM, SDRAM, Rambus RAM, EEPROM, etc.), a system interconnect 1140 (e.g., LDT, PCI, ISA, etc.), one or more network interface(s) 1150 (e.g., an ATM interface, an Ethernet interface, a Frame Relay interface, etc.), and one or more storage device(s) 1160 (e.g., optical storage, magnetic storage, etc.). Note that in some embodiments, network interface(s) 1150 may include hardware and/or software support for implementing the internal and/or external interconnect resources of the platform described herein (e.g., NAT, load balancing, VPN, WebDAV, etc.). The memory medium may include other types of memory as well, or combinations thereof. Embodiments of the invention may include fewer or additional components not illustrated in FIG. 11 (e.g., video cards, audio cards, additional network interfaces, peripheral devices, etc.). The processor unit(s) 1130, the storage device(s) 1160, the network interface 1150, and the system memory 1110 may be coupled to the system interconnect 1140.

One or more of the system memories 1110 may embody one or more file system(s) 1165 and/or database(s) 1175, as described herein. Note that in some embodiments, file systems and/or databases of the platform (from which file system or database resources may be created for a customer's virtual system) may be included in one or more storage devices 1160, instead of, or in addition to, being included in system memory 1110. Additionally, one or more of the system memories 1110 may embody customer application code and/or data 1105 including code implementing a service to be hosted on the platform on behalf of a customer. As illustrated in FIG. 11, in some embodiments, all or a portion of application code/data 1105 may be stored within one or more of file systems 1165. Note that various elements illustrated in FIG. 11 as residing in memory 1110 may in some embodiments be implemented in different memory spaces (e.g., a shared memory space and one or more local memory spaces) within a single physical memory or as different memory spaces distributed across any number of physical memories devices (e.g., in one or more storage devices 1160 and/or storage devices of a computing system other than computer system 1100), in different embodiments.

In some embodiments, memory 1110 may include program instructions 1120 configured to implement one or more virtual machines 1145 (e.g., JVMs), as described herein. Additionally, program instructions 1120 may comprise all or a portion of application program code/data 1105, which may include code configured to implement a service hosted on the platform on behalf of a customer. Program instructions 1120 may also be configured to implement various utilities and/or end-user services, shown as 1125, as described herein. For example, utilities 1125 may include an identity management utility or GUI, as described herein. In addition, program instructions 1120 may include program instructions to support internal and/or external interconnect protocols (e.g., NAT or load balancing functionality), in some embodiments. This is shown as interconnect support 1155. Program instructions 1120 may also be configured to implement one or more web servers, frameworks, and/or other macro components, shown as 1140. For example, 1140 may include program instructions to implement a web server provided by the platform, as described above.

Note that virtual machines 1145, application code 1105, utilities and/or end-user services 1125, interconnect support 1155, and servers, frameworks, and/or macro components 1140 may each be implemented in any of various programming languages or methods. For example, in one embodiment, virtual machines 1145, interconnect support 1155, utilities 1125, and macros 1140 may be Java™ based, while in other embodiments, they may be written using the C or C++ programming languages. Similarly, application program code 1105 may be implemented in Java™, C, or C++, among other programming languages, according to various embodiments. Moreover, in some embodiments, virtual machines 1145, interconnect support 1155, utilities 1125, macros 1140, and application program code 1105 may not be implemented using the same programming language. For example, application source code 1105 may be C++ based, while other components may be developed using C or Java™. Note that program instructions 1120 may in some embodiments include instructions configured to implement other functionality not shown, such as a compiler, debugger, operating system, or other standard and/or custom software components of a computing system.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A computer-implemented method, comprising:
   a computing platform receiving input on behalf of a customer specifying two or more platform resources and connections thereto, wherein the specified platform resources comprise two or more of: a computational resource, a network resource, and a storage resource;
   wherein the two or more platform resources are virtual resources allocated from a pool of platform resources shared between two or more customers;
   the computing platform receiving program code on behalf of the customer;
   the computing platform configuring a virtual system comprising the specified platform resources and dependent on the specified connections thereto;
   the computing platform executing the program code on the virtual system to host a service on behalf of the customer.

2. The method of claim 1, wherein the service is accessible by one or more end users of the service other than the customer.

3. The method of claim 1, further comprising, during said executing the program code:
   the computing platform receiving input on behalf of the customer specifying a configuration change for the virtual system; and
   in response to receiving the input specifying a configuration change, the computing platform dynamically reconfiguring the virtual system in accordance with the specified configuration change.

4. The method of claim 3, wherein the input specifying a configuration change is provided by the executing program code.

5. The method of claim 1, wherein the program code comprises program instructions defined by an application programming interface supported by the computing platform.

6. The method of claim 5, wherein the application programming interface comprises one or more of: an operation to create a resource in the virtual system, an operation to find a platform resource, an operation to configure a resource in the virtual system, an operation to change configuration of a resource in the virtual system, and an operation to destroy a resource in the virtual system.

7. The method of claim 6, wherein the operation to destroy a resource in the virtual system is executable to destroy a given platform resource instance in the virtual system if the given platform resource instance is not currently referenced by another resource in the virtual system and to not destroy the given platform resource instance if the given platform resource instance is currently referenced by another resource in the virtual system.

8. The method of claim 1, wherein at least one of the input and the program code are provided to the computing platform as a result of the execution of program instructions on a computing system other than the computing platform.

9. The method of claim 1, wherein the platform resources comprise one or more of: a network accessible file system, a database, a language-level virtual machine, a connectivity resource internal to the virtual system, an external connectivity resource, a communication interface, a communication portal, an identity management utility, an access management utility, a system monitoring utility, a debugging interface, a debugging utility, a computational utility, a graphical user interface, and a web server.

10. The method of claim 1, further comprising:
    the computing platform monitoring the virtual system during said executing the program code to detect an instance of a given system event;
    in response to detecting an instance of the given system event, the computing platform providing an indication of the given system event; and
    in response to the indication, the program code modifying the configuration of the virtual system.

11. The method of claim 10, wherein the given system event comprises a change in resource usage in the virtual system, and wherein said modifying the configuration of the virtual system comprises destroying a platform resource in the virtual system or creating an additional platform resource in the virtual system.

12. The method of claim 1, wherein the input specifying the two or more platform resources further specifies, for each resource, configuration information comprising one or more of: a name, an IP address, a host name, a host name mapping, a working directory, a home directory, an environment variable, a hardware constraint, a non-collocation constraint, a standard input file, a standard output file, a standard error file, a file system mount, an exit action, and an IP filter.

13. A computer-implemented method comprising:
    executing an operation defined by an application programming interface to obtain a reference to a computing platform comprising a pool of platform resources;
    executing operations defined by the application programming interface to create two or more resources in a virtual system from the pool of platform resources, wherein the two or more resources comprise two or more of a computational resource, a network resource, and a storage resource;
    wherein the two or more resources are virtual resources allocated from the pool of platform resources, wherein the pool of platform resources is shared between two or more entities;
    executing an operation defined by the application programming interface to configure a connection between at least two of the two or more resources in the virtual system;
    executing an operation defined by the application programming interface to populate at least one of the two or more resources in the virtual system; and
    executing an operation defined by the application programming interface to initiate operation of at least one of the two or more resources in the virtual system.

14. The method of claim 13, further comprising, in response to said initiating operation of at least one of the two or more resources in the virtual system, the virtual system executing program code configured to implement a service hosted by the computing platform and accessible to end users of the service.

15. The method of claim 13, further comprising, subsequent to said executing an operation to initiate operation of at least one of the two or more resources in the virtual system, executing an operation defined by the application programming interface to change a configuration of the virtual system, wherein the operation to change a configuration of the virtual system comprises one or more of: an operation to create an additional platform resource in the virtual system, an operation to find a platform resource, an operation to change configuration of a platform resource in the virtual system, and an operation to destroy a platform resource in the virtual system.

16. A system comprising:
one or more processors; and
a memory coupled to the one or more processors and comprising program instructions executable by the one or more processors;
wherein the program instructions are executable to implement:
obtaining a reference to a computing platform comprising a pool of platform resources;
creating two or more resources in a virtual system from the pool of platform resources, wherein the two or more resources comprise two or more of a computational resource, a network resource, and a storage resource;
wherein the two or more resources are virtual resources allocated from the pool of platform resources, wherein the pool of platform resources is shared between two or more entities;
configuring a connection between at least two of the two or more resources in the virtual system;
populating at least one of the two or more resources in the virtual system; and initiating operation of at least one of the two or more resources in the virtual system.

17. The system of claim 16, wherein the program instructions executable to implement said obtaining, said creating, said configuring, said populating, and said initiating are defined by an application programming interface supported by the computing platform.

18. The system of claim 16, wherein said populating at least one of the two of more resources comprises transferring program code to the at least one of the two or more resources, and wherein said initiating operation of at least one of the two or more resources in the virtual system comprises initiation of execution of the program code on the virtual system to implement a service hosted by the computing platform and accessible to end users of the service.

19. The system of claim 16, wherein the program instructions are further executable to implement, subsequent to said initiating, changing a configuration of the virtual system, and wherein the program instructions to implement changing a configuration of the virtual system comprise one or more of: an operation to create an additional platform resource in the virtual system, an operation to find a platform resource, an operation to change configuration of a platform resource in the virtual system, and an operation to destroy a platform resource in the virtual system.

* * * * *